United States Patent [19]
Wilson et al.

[11] Patent Number: 5,882,796
[45] Date of Patent: Mar. 16, 1999

[54] BONDED STRUCTURED RETROREFLECTIVE SHEETING

[75] Inventors: Bruce B. Wilson, Woodbury; Cheryl M. Frey, White Bear Lake, both of Minn.

[73] Assignee: Minnesota Mining and Manufacturing Company, St. Paul, Minn.

[21] Appl. No.: 625,156

[22] Filed: Apr. 1, 1996

[51] Int. Cl.$^6$ .................................................... B32B 9/04
[52] U.S. Cl. .................... 428/411.1; 428/192; 428/195; 428/500; 428/913; 156/60; 156/306.3; 156/306.6
[58] Field of Search .......................... 156/276; 359/518; 428/72, 164, 240, 241, 411.1, 500, 195, 913, 914

[56] References Cited

U.S. PATENT DOCUMENTS

| | | | |
|---|---|---|---|
| 3,176,584 | 4/1965 | De Vries et al. | 88/82 |
| 3,190,178 | 6/1965 | McKenzie | 88/82 |
| 3,689,346 | 9/1972 | Rowland | 156/245 |
| 3,712,706 | 1/1973 | Stamm | 350/103 |
| 3,810,804 | 5/1974 | Rowland | 156/245 |
| 3,811,983 | 5/1974 | Rowland | 156/245 |
| 4,025,159 | 5/1977 | McGrath | 350/105 |
| 4,111,876 | 9/1978 | Bailey et al. | 260/29.6 |
| 4,202,600 | 5/1980 | Burke et al. | 350/103 |

(List continued on next page.)

FOREIGN PATENT DOCUMENTS

| | | |
|---|---|---|
| 0 306 161 A2 | 3/1989 | European Pat. Off. |
| 0 306 162 A2 | 3/1989 | European Pat. Off. |
| 0 370 347 B1 | 5/1990 | European Pat. Off. |
| 0 508 173 A1 | 10/1992 | European Pat. Off. |
| 42 11 415 A1 | 10/1993 | Germany. |
| 2 255 044 A | 10/1992 | United Kingdom. |
| WO95/11464 | 4/1995 | WIPO. |
| WO95/11469 | 4/1995 | WIPO. |

OTHER PUBLICATIONS

R.P. Eckberg, "UV Cure of Epoxysiloxanes" in *Radiation Curing in Polymer Science & Technology: vol. IV;* Fouasser et al., Eds.; Elsevier: New York; Chapter 2, pp. 19–49 (1993).

S. Peeters, "Overview of Dual–Cure and Hybrid–Cure Systems in Radiation Curing" in *Radiation Curing in Polymer Science and Technology: vol. III;* Fouasser et al., Eds.; Elsevier: New York; Chapter 6, pp. 177–217 (1993).

A. Prioia et al., "Factors Influencing the Adhesion Properties of Radiation Curable Coatings on Different Substrates", *XIII$^{th}$ International Conference in Organic Coatings Science and Technology,* 303–318 (1987).

*Federation Series on Coatings Technology: Radiation Cured Coatings;* Federation of Societies for Coatings Technology: Philadelphia; pp. 7–13 and 24 (Jun. 1986).

"Standard Test Method for Bond or Cohesive Strength of Sheet Plastics and Electrical Insulating Materials", ASTM Designation: D 952—93, 205–207 (Dec. 1993).

"Standard Test Method for Coefficient of Retroreflection of Retroreflective Sheeting", ASTM Designation: E 810—94, 818–824 (Apr. 1994).

W.L. Hensley et al. In *Federation Series On Coating Techonology: Amino Resins in Coatings;* Federation of Societies for Coatings Technology: Philadelphia; pp. 5–31 (Dec. 1969).

"Centrex High Performance Materials For All Seasons", Brochure of Monsanto Plastics, 49 pp. (Undated).

*Primary Examiner*—William Krynski
*Assistant Examiner*—Betelhem Shewareged
*Attorney, Agent, or Firm*—Robert H. Jordan

[57] ABSTRACT

The present invention provides a retroreflective sheeting including a structured retroreflective film including an array of structured retroreflective elements, a thermoplastic sealing film located proximate the structured elements, and bonding agent between the sealing film and the structured retroreflective elements, wherein the bonding agent bonds the sealing film to the structured retroreflective film.

37 Claims, 3 Drawing Sheets

U.S. PATENT DOCUMENTS

| | | | |
|---|---|---|---|
| 4,202,948 | 5/1980 | Peascoe | 525/70 |
| 4,243,618 | 1/1981 | Van Aram | 264/1 |
| 4,327,130 | 4/1982 | Pipkin | 427/209 |
| 4,332,437 | 6/1982 | Searight et al. | 350/103 |
| 4,332,847 | 6/1982 | Rowland | 428/156 |
| 4,345,543 | 8/1982 | Pipkin | 118/106 |
| 4,349,598 | 9/1982 | White | 428/161 |
| 4,387,124 | 6/1983 | Pipkin | 427/356 |
| 4,391,948 | 7/1983 | Falk et al. | 525/57 |
| 4,393,171 | 7/1983 | Bracke et al. | 525/309 |
| 4,393,172 | 7/1983 | Lindner et al. | 525/310 |
| 4,418,120 | 11/1983 | Kealy et al. | 428/343 |
| 4,436,871 | 3/1984 | Staas | 525/64 |
| 4,438,171 | 3/1984 | Wefer | 428/215 |
| 4,440,825 | 4/1984 | Paddock | 428/318.6 |
| 4,442,144 | 4/1984 | Pipkin | 427/355 |
| 4,444,840 | 4/1984 | Wefer | 428/339 |
| 4,444,841 | 4/1984 | Wheeler | 428/339 |
| 4,522,964 | 6/1985 | Lindner et al. | 524/71 |
| 4,528,328 | 7/1985 | Ranade et al. | 525/71 |
| 4,537,933 | 8/1985 | Walker et al. | 525/71 |
| 4,562,229 | 12/1985 | Walker et al. | 525/71 |
| 4,576,850 | 3/1986 | Martens | 428/156 |
| 4,576,860 | 3/1986 | Fink et al. | 428/314.4 |
| 4,587,297 | 5/1986 | Walker et al. | 525/64 |
| 4,588,258 | 5/1986 | Hoopman | 350/103 |
| 4,601,861 | 7/1986 | Pricone et al. | 264/1.6 |
| 4,652,274 | 3/1987 | Boettcher et al. | 51/298 |
| 4,672,089 | 6/1987 | Pricone et al. | 524/354 |
| 4,731,414 | 3/1988 | Ting | 525/71 |
| 4,751,138 | 6/1988 | Tumey et al. | 428/323 |
| 4,775,219 | 10/1988 | Appleldorn et al. | 350/103 |
| 4,801,193 | 1/1989 | Martia | 350/103 |
| 4,831,079 | 5/1989 | Ting | 525/71 |
| 4,880,554 | 11/1989 | Newman et al. | 525/67 |
| 4,880,875 | 11/1989 | Wassmuth et al. | 525/67 |
| 4,885,209 | 12/1989 | Lindner et al. | 428/420 |
| 4,885,335 | 12/1989 | Gallucci et al. | 525/67 |
| 4,894,416 | 1/1990 | Gallaucci | 525/74 |
| 4,895,428 | 1/1990 | Nelson et al. | 350/103 |
| 4,903,440 | 2/1990 | Larson et al. | 51/298 |
| 4,983,436 | 1/1991 | Bailey et al. | 428/40 |
| 4,985,340 | 1/1991 | Palazzotto et al. | 430/270 |
| 5,055,113 | 10/1991 | Larson et al. | 51/298 |
| 5,064,272 | 11/1991 | Bailey et al. | 359/541 |
| 5,066,098 | 11/1991 | Kult et al. | 359/540 |
| 5,068,285 | 11/1991 | Laughner | 525/67 |
| 5,070,142 | 12/1991 | Giles, Jr. et al. | 525/66 |
| 5,070,665 | 12/1991 | Marrin et al. | 52/239 |
| 5,082,897 | 1/1992 | Udipi | 525/67 |
| 5,104,934 | 4/1992 | Udipi | 525/67 |
| 5,106,919 | 4/1992 | Canova et al. | 525/234 |
| 5,117,304 | 5/1992 | Huang et al. | 359/529 |
| 5,120,788 | 6/1992 | Seitz et al. | 525/85 |
| 5,162,423 | 11/1992 | Neumann et al. | 524/504 |
| 5,196,480 | 3/1993 | Seitz et al. | 525/71 |
| 5,236,472 | 8/1993 | Kirk et al. | 51/298 |
| 5,272,562 | 12/1993 | Coderre | 359/529 |
| 5,306,548 | 4/1994 | Zabrocki et al. | 428/215 |
| 5,310,436 | 5/1994 | Pricone et al. | 156/209 |
| 5,450,235 | 9/1995 | Smith et al. | 359/529 |

BONDED STRUCTURED RETROREFLECTIVE SHEETING

FIELD OF THE INVENTION

This invention pertains to a structured retroreflective sheeting having a sealing film bonded to structured retroreflective film using a bonding agent.

BACKGROUND OF THE INVENTION

Retroreflective sheeting has the ability to redirect incident light towards its originating source. This advantageous property has led to the widespread use of retroreflective sheeting on a variety of articles. Typical examples of retroreflective sheeting are microsphere-based sheeting and cube-corner sheeting.

Microsphere-based sheeting, sometimes referred to as "beaded" sheeting, is well known in the art and employs a multitude of glass or ceramic microspheres, typically at least partially embedded in a binder layer and having associated specular or diffuse reflecting materials (e.g., pigment particles, metal flakes, or vapor coats) to retroreflect incident light. Examples of such retroreflectors are disclosed in, for example, U.S. Pat. Nos. 3,190,178 (McKenzie), 4,025,159 (McGrath), 5,064,272 (Bailey et al.), and 5,066,098 (Kult).

Structured retroreflectors typically comprise a sheet having a generally planar front surface and an array of structured retroreflecting elements protruding from the back surface. One variety of structured retroreflectors are cube-corner retroreflectors. Cube-corner reflecting elements comprise generally trihedral structures that have three approximately mutually perpendicular lateral faces meeting in a single corner. In use, the retroreflector is arranged with the front surface disposed generally toward the anticipated location of intended observers. Light incident to the front surface enters the sheet, passes through the body of the sheet to be internally reflected by the faces of the structured elements so as to exit the front surface in a direction substantially toward the light source (i.e., it is retroreflected).

The light rays are typically reflected at the faces of the structured elements due to either total internal reflection (TIR), or due to specular reflective coatings such as a vapor-deposited aluminum film. Reflectors relying on total internal reflection require an interface between the faces and a material, typically air, having a lower index of refraction. Examples of cube-corner structured retroreflective sheetings are disclosed in U.S. Pat. Nos. 3,712,706 (Stamm), 4,025,159 (McGrath), 4,202,600 (Burke et al.), 4,243,618 (Van Arnam), 4,349,598 (White), 4,576,850 (Martens), 4,588,258 (Hoopman), 4,775,219 (Appeldom et al.), 4,895,428 (Nelson et al.), 5,272,562 (Coderre), and 5,450,235 (Smith et al.), as well as in PCT Publication Nos. WO 95/11464 (Benson et al.) and WO 95/11469 (Benson et al.). Typically, structured retroreflective sheetings exhibit a retroreflective brightness (i.e., a coefficient of retroreflection) of greater than about 50 candela/lux/square meter.

In applications in which the structured retroreflective sheeting is likely to be exposed to moisture (e.g., outdoors or in high humidity), the structured retroreflective elements can be encapsulated with a conformable sealing film, as disclosed, for example, U.S. Pat. Nos. 4,025,159 (McGrath), 5,117,304 (Huang), and 5,272,562 (Coderre). Conventional sealing films may be single or multi-layer thermoplastic or thermoplastic/thermoset films that are attached to the structured surface. The sealing film maintains an air interface around the structured elements to maintain retroreflectivity due to the lower refractive index. The sealing film also protects the surfaces from degradation caused by environmental exposure.

The sealing film is typically attached to the structured film with the application of heat and pressure using an embossing tool on the sealing film to create a cellular pattern (i.e., cells). These contact areas between the sealing film and the tips of the structured elements do not retroreflect. In addition, the heat used to bond the sealing film to the structured film can also distort the structured elements near the bonds, reducing their ability to retroreflect light.

SUMMARY OF THE INVENTION

The present invention provides a retroreflective sheeting including an array of structured retroreflective elements, a thermoplastic sealing film located proximate the structured elements, and a bonding agent between the sealing film and the structured retroreflective elements, wherein the bonding agent bonds the sealing film to the structured retroreflective elements.

The bonding agent and sealing film are applied as two separate layers of material. Preferably, the bonding agent forms a discontinuous layer between the sealing film and the array of structured retroreflective elements.

The bonding agent can be prepared from a bonding agent precursor comprising radiation curable components. The radiation curable components preferably comprise a cationic curable resin, a free radical curable resin, or mixtures thereof. More preferably, the radiation curable components include an acrylate.

In another aspect, the bonding agent can be prepared from a bonding agent precursor comprising a reactive diluent and a film former. Some preferred reactive diluents comprise monofunctional or multifunctional acrylate monomers. One preferred film former comprises a monofunctional or multifunctional acrylate oligomer.

The present invention also includes methods of manufacturing the various embodiments of the retroreflective sheetings according to the present invention.

The above and other features of the various embodiments of the invention are more fully shown and described in the drawings and detailed description of this invention, where like reference numerals are used to represent similar parts. It is to be understood, however, that the description and drawings (which are not to scale) are for the purposes of illustration only and should not be read in a manner that would unduly limit the scope of this invention.

DETAILED DESCRIPTION OF THE INVENTION

In describing preferred embodiments of the invention, specific terminology will be used for the sake of clarity. The invention, however, is not intended to be limited to the specific terms so selected, and it is to be understood that each term so selected includes all technical equivalents that operate similarly.

Structured retroreflective sheetings according to the present invention include a structured retroreflective film comprising a multitude of structured elements, and a sealing film attached to the structured elements to create a cellular pattern. As used herein, "structured retroreflective sheeting" and its variations include all structured films used for retroreflection of incident light. One typical example of a structured retroreflective sheeting is cube-corner retroreflective sheeting and that variation is used in many of the discussions below, but it should be understood that the present invention includes retroreflective sheetings incorporating other geometries in addition to typical cube-corner constructions.

Figure 1:
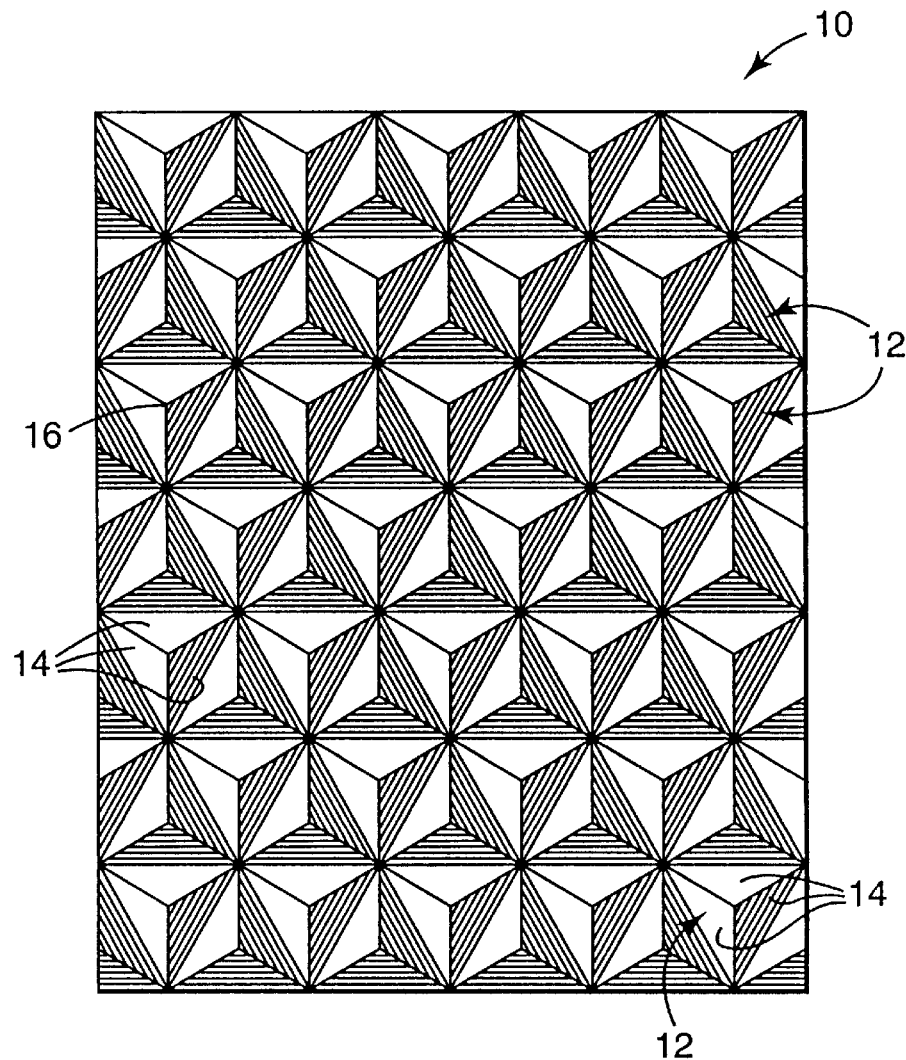
FIG. 1 is a top view of the back side of a cube-corner retroreflective sheeting.
Figure 2:
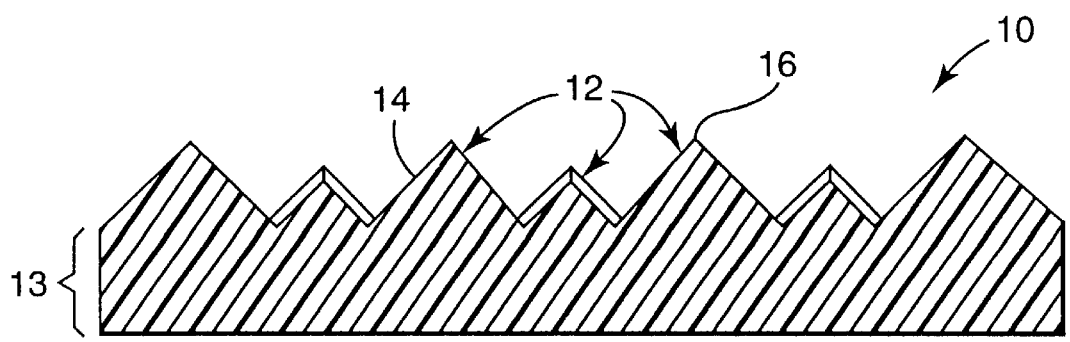
FIG. 2 is a cross-sectional view of the array of cube-corner elements shown in FIG. 1.

FIGS. 1 and 2 schematically illustrate a portion of a typical replicated cube-corner retroreflective sheeting 10. The geometry or configuration of these types of articles are described in, for example, U.S. Pat. Nos. 3,810,804 (Rowland) and 4,588,258 (Hoopman). Referring to both FIGS. 1 and 2, reference 12 generally designates one of the minute cube-corner elements of formations disposed in an array on one side of sheeting 10. Each element 12 has the shape of a trihedral prism with three exposed planar faces 14, substantially perpendicular to one another, with the apex 16 of the prism vertically aligned with the center of the base. The angle between the faces 14 is the same for each cube-corner element in the array, and is about 90°. The angle, however, can slightly deviate from 90°, depending on the desired application. Although the apex 16 of each cube-corner element 12 can be vertically aligned with the center of the base of the cube-corner element, it can also be canted away from the center of the base as disclosed in U.S. Pat. No. 4,588,258 (Hoopman). The sheeting described in U.S. Pat. No. 4,588,258 (Hoopman) is preferred because it provides wide angle retroreflection among multiple viewing planes.

As illustrated in FIG. 1, cube-corner elements 12 in sheeting 10 can be all of the same dimensions and aligned in an array or pattern of rows and columns, the bases being in the same plane. If desired, however, different elements in the array can have varying dimensions and orientations. Cube-corner elements 12 surmount body portion 13, the lower or front surface 20 of which is substantially smooth or planar. The body portion 13, which is often referred to as the "land," is typically integral with cube-corner optical elements 12. The dimensions of the land portion of the sheeting relative to the individual cube-corner elements can vary depending on the method chosen for manufacture and, ultimately, the end use of the sheeting.

The sealing film in the retroreflective sheetings according to the present invention protects the structured elements in the structured film from environmental degradation. It also provides a sealed air layer around the structured elements, which retains the required refractive index differential needed for total internal reflection. Typically, the sealing film is thermally bonded or embossed to the structured retroreflective film in a pattern forming a plurality of hermetic cells. Cellular patterns useful in connection with the present invention can vary, but one example is depicted in U.S. Pat. No. 4,025,159 (McGrath).

Typically, the retroreflective sheeting of the present invention, exhibits a retroreflective brightness, i.e., a coefficient of retroreflection, of greater than about 50, preferably, greater than about 250, and more preferably, greater than about 500 candela/lux/square meter, measured according to ASTM Method E 810-94 at an entrance angle of –4° and an observation angle of –0.2°, when the sheeting is laying flat.

Preferred embodiments of the present invention include a separate layer of a bonding agent disposed on the sealing film to bond the sealing film to the structured retroreflective film, thereby protecting the structured elements from environmental attack. In some embodiments, the bonding agent material may also provide additional mechanical strength to the retroreflective sheeting. The structured retroreflective film, sealing film, and/or the bonding agent can also be used to impart color to the retroreflective sheeting. Also, certain embodiments of the retroreflective sheeting according to the present invention include an overlay film disposed on the structured retroreflective film on a surface opposite to that of the sealing film.

A backing or an adhesive layer can be provided on the retroreflective sheeting to secure it to a substrate if desired. A variety of heat-activated, solvent-activated, pressure-sensitive or other adhesives can be coated on, or laminated to, the back surface of the retroreflective sheeting to adhere it to a substrate. A release liner can also be disposed on the adhesive layer, if desired. In one application, the retroreflective sheetings manufactured according to the present invention can be attached to a signboard for use as interior or exterior signs for, e.g., traffic control, commercial advertising, information, etc.

Figure 3:
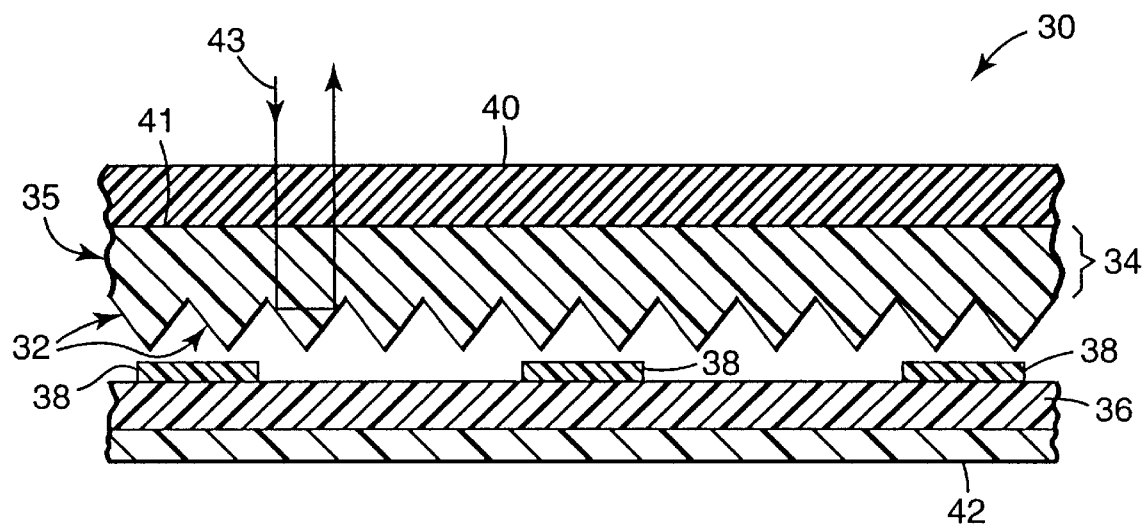
FIG. 3 is a cross-sectional view of one embodiment of a retroreflective sheeting according to the present invention.

FIG. 3 schematically depicts a cross-section of one embodiment of a cube-corner retroreflective sheeting 30 of the present invention. In this embodiment, cube-corner retroreflective sheeting 30 comprises a cube-corner film 35 including a multitude of cube-corner elements 32 and a body or "land" portion 34, a sealing film 36, a discontinuous layer of bonding agent 38 located between the sealing film and the cube-corner film to bond the two together. The sealing film 36 provides protection from environmental degradation to the cube-corner elements 32 and may also provide additional mechanical integrity to the retroreflective sheeting 30.

FIG. 3 also depicts an optional overlay film 40 located on the front surface of the cube-corner film 35. In a preferred embodiment, the overlay film 40 is the outermost layer on the front side of the sheeting 30. The land portion 34 of the cube-corner film 35 is distinguished from the overlay film 40 as a layer disposed immediately adjacent to the bases of the cube-corner elements 32.

In the retroreflective sheeting according to the present invention, the cube-corner film 35 and the optional overlay film 40 each preferably comprise a light transmissible polymeric material (in the absence of colorants), which for the cube-corner elements 32 and the land portion 34 of the cube-corner film 35 may be the same or different. Light enters the cube-corner sheeting 30 through the front surface 41. The light then passes through the sheeting and strikes the planar faces of the cube-corner elements 32. The reflected light then returns in substantially the general direction from which it came as shown by arrow 43.

The polymeric materials of cube-corner film 35 (or any structured retroreflective film according to the present invention) and overlay film 40 are preferably light transmissible (in the absence of colorants). This means that the polymer is able to transmit at least about 70% of the light incident upon it at a given wavelength. Preferably, the polymers have a light transmissibility of greater than about 80%, and more preferably greater than about 90%. Thus, particularly preferred light transmissible polymers are substantially transparent. The polymeric materials of sealing film 36 and bonding agent 38 of the invention may or may not be light transmissible, but they are generally impermeable to materials that can degrade the structured elements.

One or more of the cube-corner film 35, sealing film 36, bonding agent 38, and overlay film 40 can be modified to include colorants such as dyes and/or pigments. As a result, the retroreflective sheeting 30 may exhibit a first color in daylight or any other substantially noncollimated light (i.e., nonretroreflected light) and a second color when illuminated by generally collimated light such as vehicle headlights (i.e., light that is generally retroreflected). Methods of incorporating colorants into these components of the sheeting 30 will be known to those skilled in the art.

Figure 4:
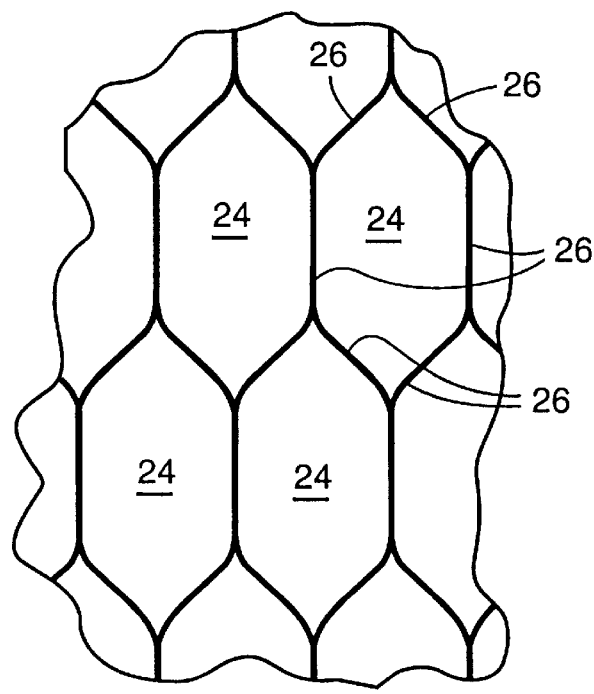
FIG. 4 is a schematic diagram of one pattern of bonding agent material used to bond the cube-corner film and sealing film.

The cube-corner film 35 and the sealing film 36 are bonded together using a separate layer of a bonding agent 38. As depicted in FIG. 3, the bonding agent 38 is preferably discontinuously coated on the sealing film 36. FIG. 4 depicts one preferred pattern for coating the bonding agent 38 on the sealing film 36. The pattern of FIG. 4 forms a series of cells 24, with each of the cells 24 bounded by seal legs 26 that generally correspond to a pattern formed on a printing tool or other applicator.

Although it is preferred to use a repeating pattern for applying the bonding agent 38 to the sealing film 36, it should be understood that the bonding agent 38 could alternatively be provided in any desired pattern, including repeating patterns, as well as randomly dispersed over the sealing film 36. Furthermore, any pattern (if used) may or may not form cells as depicted in FIG. 4.

The amount of surface area covered by the bonding agent 38 should be balanced between the competing needs for bond strength and retroreflective efficiency. To balance those competing needs, the bonding agent 38 would preferably occupy only up to about 50% of the interface between the cube-corner film 35 and sealing film 36. More preferably, up to about 30%, and even more preferably up to about 15–20%.

Also, it should also be understood that the bonding agent 38 could alternatively be applied to the cube-corner film 35 rather than the sealing film 36. If that approach is used, the physical properties, e.g., viscosity, of the bonding agent 38 may need to be carefully controlled to maintain relatively well-defined seal legs that could, for example, define cells as depicted in FIG. 4.

The thickness of the bonding agent 38 also plays a role in bond strength and retroreflective efficiency of the retroreflective sheeting 30. A thicker layer of bonding agent 38 may improve bond strength while at the same time wetting more surface area of the affected cube-corner elements 32, thereby reducing total internal reflection and retroreflective efficiency. Conversely, although a thinner layer may improve retroreflective efficiency, it may also reduce the bond strength between the cube-corner film 35 and sealing film 36. In any given retroreflective sheeting constructed according to the present invention, the actual thickness of the bonding agent 38 will depend on a number of factors such as bonding ability of the particular bonding agent composition used, the surface area occupied by the bonding agent, and the required bond strength between the cube-corner film 35 and sealing film 36. As one example, in retroreflective sheeting in which a bonding agent 38 is patterned (the formulation of which is described more completely below) and occupies about 15–20% of the sealing film 36, the bonding agent 38 is preferably provided in a thickness of about 75–300 micrometers. Typically, however, the bonding agent 38 thickness depends on the height of the cube-corner elements and the need for hermetic seals in the bonded areas, i.e., if a hermetic seal is desired, a sufficient amount of bonding agent must be applied to fill the areas between cubes in the bond.

By eliminating the need for embossing the sealing film 36 to bond it to the cube-corner film 35, use of the bonding agent 38 may prevent the formation of indentations and other discontinuities in the sealing film 36. By so doing, retroreflective sheetings constructed according to the present invention can reduce moisture penetration between the retroreflective sheeting and a base such as an aluminum sign plate. That moisture penetration can cause humidity-induced construction buckling that can result in localized areas of delamination between the sheeting and the base. This is particularly true when the adhesive used to attach the film 30 to the backing is substantially stiff (i.e., the adhesive does not fill in or otherwise conform to and fill in any indentations in the retroreflective sheeting).

Any suitable method of applying the bonding agent 38 to the sealing film 36 or cube-corner film 35 can be used in connection with the present invention. Examples include spray coating, rotogravure printing, screen printing, notched bar coating, etc.

Figure 5:
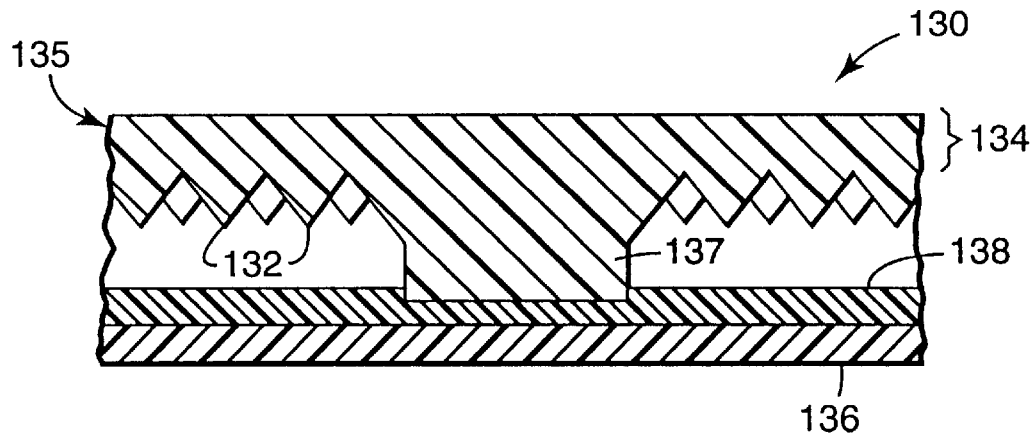
FIG. 5 is a cross-sectional view of an alternative embodiment of a retroreflective sheeting according to the present invention incorporating a raised structure.

An alternative embodiment of a cube-corner film 130 is depicted in FIG. 5. That embodiment of the retroreflective cube-corner sheeting 130 includes cube-corner film 135 having a plurality of cube-corner elements 132 and a land portion 134 to which the elements 132 are attached. The retroreflective sheeting 130 may also include an overlay film (not shown) as discussed above with respect to the embodiment depicted in FIG. 3. The primary difference between the cube-corner films 35 (depicted in FIG. 3) and 135 (depicted in FIGS. 5 and 6) is that the cube-corner film 135 includes a raised structure 137 rising from the land portion 134 and extending beyond the tips of the cube-corner elements 132.

Figure 6:
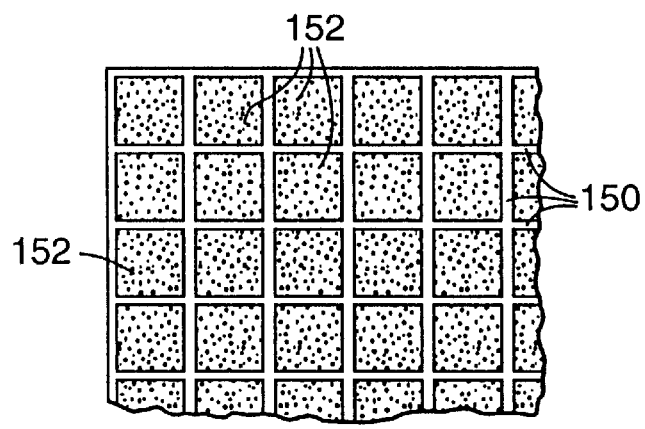
FIG. 6 is a plan view of one pattern of raised structures in a cube-corner retroreflective film useful in manufacturing retroreflective sheeting according to the present invention.

Referring to FIG. 6, the raised structure 137 can be provided as ridges 150 in a pattern as shown, where the ridges 150 define areas 152 in which the cube-corner elements 132 are located. Although a repeating pattern of raised ridges 150 is a preferred embodiment of the raised structure 137, it should be understood that the raised structure 137 may be provided as ridges that do not intersect and that may also be randomly oriented. As a further alternative, the raised structure 137 could be provided as unconnected plateaus rising above the land portion 134. In such an embodiment, the plateaus may be located in a patterned array or they may be randomly dispersed over the surface of the cube-corner film 135.

The retroreflective sheeting 130 also includes a layer of bonding agent 138 to which the raised structure 137 is attached. It is preferred that the bonding agent 138 be provided on the sealing film 136, but it will be understood that the bonding agent 138 could alternatively be provided on the surface of the raised structure 137 and then attached to the sealing film 136. In another variation, the bonding agent 138 is depicted in FIG. 5 as covering the entire surface of the sealing film 136, but it should be understood that it could be provided in a discontinuous layer (in a repeating pattern or otherwise). The primary requirement in any situation would be to insure that the amount of bonding agent 138 bonding the cube-corner film 135 to the sealing film 136 was sufficient to provide the desired bond strength, and potentially hermetic seal if desired.

Figure 7:
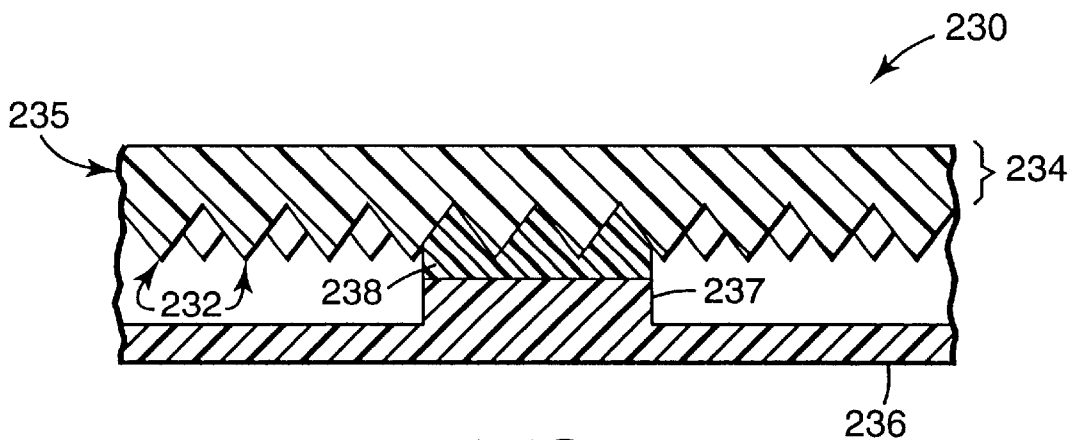
FIG. 7 is a cross-sectional view of an alternative embodiment of a cube-corner retroreflective sheeting according to the present invention incorporating a raised structure extending from the sealing film.

A further variation on the embodiment depicted in FIG. 5 is shown in FIG. 7. Rather than providing a raised structure 137 in connection with the cube-corner film 135 as shown in FIG. 5, the sealing film 236 of the sheeting 230 could be provided with a raised structure 237. The raised structure 237 on the sealing film could then be coated with a layer of bonding agent 238 and bonded to the cube-corner film 235. In this embodiment, it may be advantageous to texture or otherwise modify the upper surface of raised structure 237 to receive the cube-corner elements 232 in a somewhat complementary manner to further increase bond strength. Texturing of the raised structure 237 may also enhance retention of the bonding agent 238 along the seal areas formed between the sealing film 236 and cube-corner film 235.

One advantage of including a raised structure in either the structured retroreflective film or the sealing film is that it provides additional spacing between the tips of the structured elements and the sealing film in the areas not occupied by the raised structure. That additional space is useful to insure that the tips of the structured elements do not come into contact with the sealing film. If the tips do contact the sealing film, the refractive index difference is such that total internal reflection may not occur, allowing light to "leak" out of the structured elements—thereby reducing the efficiency of the retroreflective sheeting.

Structured Retroreflective Film

The polymeric materials of the structured elements, and preferably the land portion, are thermoplastic, and tend to be hard, rigid materials with a high index of refraction (relative to other polymers) such that the resultant products possess highly efficient retroreflective properties as well as sufficient durability and weatherability. Herein, the term "thermoplastic" is used in its conventional sense to mean a material that softens when exposed to heat and returns to its original condition when cooled.

Suitable polymeric materials of the structured elements are thermoplastic materials with a relatively high index of refraction, a relatively high glass transition temperature (Tg), and melt temperature (Tm). Typically, the index of refraction of the polymer of the structured elements is at least about 1.5. Typically, the Tg is greater than about 100° C., and preferably, greater than about 120° C.

Generally, the thermoplastic polymers used in the structured elements are amorphous or semi-crystalline. In embodiments in which there is no overlay film, the thermoplastic polymers used in the structured elements, and preferably the land portion, are chemically and mechanically durable such that they resist degradation from environmental elements. The polymeric materials used in the land portion of the structured retroreflective film, as indicated above, can be the same as the polymers that are employed in the structured elements.

Examples of thermoplastic polymers that can be used in the structured elements include, but are not limited to: acrylic polymers such as poly(methyl methacrylate); polycarbonates; polyimides; cellulosics such as cellulose acetate, cellulose (acetate-co-butyrate), cellulose nitrate; polyesters such as poly(butylene terephthalate), poly(ethylene terephthalate); fluoropolymers such as poly (chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly (etherimide); polyolefins such as poly(methylpentene); poly (phenylene ether); poly(styrene) and poly(styrene) copolymers such as poly(styrene-co-acrylonitrile), poly (styrene-co-acrylonitrile-co-butadiene); silicone modified polymers (i.e., polymers that contain a small weight percent (less than 10 weight percent) of silicone) such as silicone polyimide and silicone polycarbonate; fluorine modified polymers such as perfluoropoly(ethyleneterephthalate); and mixtures of the above polymers such as a polyimide and acrylic polymer blend, and a poly(methylmethacrylate) and fluoropolymer blend.

Preferred thermoplastic polymers for the structured elements include acrylic polymers, polycarbonates, polyimides, and mixtures thereof. These polymers are preferred for one or more of the following reasons: impact resistance; dimensional stability; thermal stability; environmental stability; clarity; excellent release from the tooling or mold; and high refractive index. The most preferred polymer for the structured elements is a polycarbonate such as bis-phenol-A polycarbonate, which is available under the trade designations MOBAY MAKROLON 2407 and 2507 from Mobay Corp., Pittsburgh, Pa., and LEXAN 123R from General Electric Co., Pittsfield, Mass.

The polymeric materials used in the structured retroreflective film of the present invention can include additives such as acid scavengers and UV absorbers. These are particularly useful to prevent degradation of the polymeric material during processing and upon exposure to environmental conditions (e.g., UV radiation). Examples of acid scavengers for polycarbonates include phosphite stabilizers. Examples of UV absorbers include derivatives of benzotriazole such as those available under the trade designations TINUVIN 327, 328, 900, 1130, and TINUVIN-P from Ciba-Geigy Corporation, Ardsley, N.Y.; chemical derivatives of benzophenone such as those available under the trade designations UVINUL-M40, 408, and D-50 from BASF Corporation, Clifton, N.J., and SYNTASE 800 (2-hydroxy-4-n-octyl benzophenone) from Great Lakes Chemical, West Lafayette, Ind.; and chemical derivatives of diphenylacrylate such as those available under the trade designations UVINUL-N35 and 539 from BASF Corporation of Clifton, N.J. Certain polymeric materials include phosphite stabilizers and/or UV absorbers when purchased from the manufacturer.

Other additives, such as colorants, light stabilizers, free radical scavengers or antioxidants, processing aids such as antiblocking agents, releasing agents, lubricants, and the like can also be added to the polymeric materials of the structured layer. These additives can be included in the polymeric materials of the structured layer in amounts to achieve the desired result, which can be readily determined by one of skill in the art.

The particular colorant selected, of course, depends on the desired color of the sheeting. If a colorant is used, it should not undesirably impair the transparency of the retroreflective sheeting. Colorants can include dyes and/or pigments. They typically are used in an amount of about 0.01–2.0 wt-%, preferably about 0.01–0.5 wt-%, based on the total weight of the structured film.

Light stabilizers that can be used include hindered amines, which are typically used at about 0.5–2.0 wt-%, based on the total weight of the structured film. A wide variety of hindered amine light stabilizers can be used to advantage. Examples include 2,2,6,6-tetraalkyl piperidine compounds, as well as those available under the trade designations TINUVIN-144, 292, 622,770, and CHIMASSORB-944 from the Ciba-Geigy Corp., Ardsley, N.Y.

Free radical scavengers or antioxidants can be used, typically, at about 0.01–0.5 wt-%, based on the total weight of the structured film. Suitable antioxidants include hindered phenolic resins such as those available under the trade designations IRGANOX-1010, 1076, and 1035, as well as MD-1024 and IRGAFOS-168 from the Ciba-Geigy Corp., Ardsley, N.Y.

Small amounts of other processing aids, typically no more than one weight percent of the polymer resins, can be added to improve processability. Useful processing aids include fatty acid esters, or fatty acid amides available from Glyco Inc., Norwalk, Conn., as well as metallic stearates available from Henkel Corp., Hoboken, N.J.

A variety of techniques and methods are known for fabrication of structured retroreflective films. For example, the structured retroreflective film of the retroreflective sheetings of the invention can be made by forming a plurality of structured elements from a light transmissible material, using a tool having a molding surface with a plurality of cavities suitable for forming structured elements. If desired, an overlay film can be secured to the base of the structured elements to function as a land, or it can be secured to the structured elements by the land portion of the structured retroreflective film. These steps can be carried out according to a variety of known methods such as those disclosed in U.S. Pat. Nos. 3,689,346 (Rowland), 3,811,983 (Rowland), 4,332,847 (Rowland), 4,601,861 (Pricone et al.), and 5,450,235 (Smith et al.).

Sealing Film

In the cube-corner reflective sheeting of the present invention, a sealing film is used behind the structured retroreflective film. The sealing film maintains an air space around a majority of the structured elements. Because the index of refraction for air is lower than the index of refraction for the material used in the structured elements, total internal reflection is fostered to provide the desired reflectivity. The sealing film also serves as a barrier for foreign materials such as water, oil, dust, etc., and can provide mechanical strength to the construction. The sealing film is typically substantially continuous and substantially coextensive with the array of structured elements. It is separate and distinct from the bonding agent, at least upon initial application.

Suitable polymeric materials used in the sealing film are thermoplastic materials that are generally resistant to degradation by weathering (e.g., UV light, moisture) so that the retroreflective sheeting can be used for long-term outdoor applications. Because it may also serve as a substrate for coating with an adhesive for mounting the construction to a base such as an aluminum plate, the thermoplastic polymeric material should be chosen such that it adheres well to the adhesive. If an opaque or colored sealing film is desired, the polymeric material used for the sealing film should also be compatible with various pigments and/or dyes.

Examples of thermoplastic polymers suitable for use in the sealing film include, but are not limited to: acrylate polymers such as poly(methyl methacrylate); polycarbonates; polyimides; cellulosics such as cellulose acetate, cellulose (acetate-co-butyrate), cellulose nitrate; polyesters such as poly(butylene terephthalate), poly(ethylene terephthalate); fluoropolymers such as poly(chlorofluoroethylene), poly(vinylidene fluoride); polya-
mides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a polyimide and acrylic polymer blend, and a poly(methylmethacrylate) and fluoropolymer blend; ionomeric ethylene copolymers; plasticized vinyl halide polymers; acid functional polyethylene copolymers; aliphatic or aromatic polyurethanes; poly-alpha-olefins; polymers of ethylene-propylene-diene monomers ("EPDM"), including ethylene-propylene-nonconjugated diene ternary copolymers grafted with a mixture of styrene and acrylonitrile (also known as acrylonitrile EPDM styrene or "AES"); styrene-acrylonitrile ("SAN") copolymers including graft rubber compositions such as those comprising a crosslinked acrylate rubber substrate (e.g., butyl acrylate) grafted with styrene and acrylonitrile or derivatives thereof (e.g., alpha-methyl styrene and methacrylonitrile) known as "ASA" or acrylate-styrene-acrylonitrile copolymers, and those comprising a substrate of butadiene or copolymers of butadiene and styrene or acrylonitrile grafted with styrene or acrylonitrile or derivatives thereof (e.g., alpha-methyl styrene and methacrylonitrile) known as "ABS" or acrylonitrile-butadiene-styrene copolymers, as well as extractable styrene-acrylonitrile copolymers (i.e., nongraft copolymers) also typically referred to as "ABS" polymers; and combinations or blends thereof. Herein, the term "copolymer" includes terpolymer, tetrapolymer, etc.

Preferred polymers for use in the sealing film are within the styrenic family of multiphase copolymer resins (i.e., a multiphase styrenic thermoplastic copolymer of immiscible monomers) referred to above as AES, ASA, and ABS, and combinations or blends thereof. Such polymers are disclosed in U.S. Pat. Nos. 4,444,841 (Wheeler), 4,202,948 (Peascoe), and 5,306,548 (Zabrocki et al.). The blends may be in the form of a multilayered film where each layer is a different resin, or physical blends of the polymers which are then extruded into a single film. For example, ASA and/or AES resins can be coextruded over ABS. Multiphase AES, ASA, and ABS resins are used in a variety of applications in which they are used alone, together, or in combination with a variety of other resins to make moldable products such as garden furniture, boat hulls, window frames, and automotive body parts, for example.

Particularly preferred polymers for use in the sealing film are the multiphase AES and ASA resins, and blends thereof Such polymers contribute to retention of the peel strength of the retroreflective sheeting with time.

Commercially available AES and ASA resins, or combinations thereof, include, for example, those available under the trade designations ROVEL from Dow Chemical Company, Midland, Mich., and LORAN S 757 and 797 from BASF Aktiengesellschaft, Ludwigshafen, Fed. Rep. of Germany), CENTREX 833 and 401 from Bayer Plastics, Springfield, Conn., GELOY from General Electric Company, Selkirk, N.Y., VITAX from Hitachi Chemical Company, Tokyo, Japan. It is believed that some commercially available AES and/or ASA materials also have ABS blended therein. The sealing film can also be prepared from a blend or combination of the above-listed materials. Commercially available SAN resins include those available under the trade designation TYRIL from Dow Chemical, Midland, Mich. Commercially available ABS resins include those available under the trade designation CYOLAC such as CYOLAC GPX 3800 from General Electric, Pittsfield, Mass. Commercially available polycarbonate/ABS resins include those available under the trade designations PULSE 1350 and 1370 from Dow Chemical Company, Midland, Mich.

These polymer compositions may include other ingredients including UV stabilizers and antioxidants such as those available from Ciba Geigy under the trade designation IRGANOX, fillers such as talc, reinforcing agents such as MICA or glass fibers, fire retardants, antistatic agents, mold release agents such as fatty acid esters available under the trade designations LOXIL G-715 or LOXIL G-40 from Henkel Corp., Hoboken, N.J., or WAX E from Hoechst Celanese Corp., Charlotte, N.C. Colorants, such as pigments and dyes, can also be incorporated into the polymer compositions of the sealing film. Examples of colorants include rutile $TiO_2$ pigment available under the trade designation R960 from DuPont de Nemours, Wilmington, Del., iron oxide pigments, carbon black, cadmium sulfide, and copper phthalocyanine. Often, the above-identified polymers are commercially available with one or more of these additives, particularly pigments and stabilizers. Typically, such additives are used in amounts to impart desired characteristics. Preferably, they are used in amounts of about 0.02–20 wt-%, and more preferably 0.2–10 wt-%, based on the total weight of the polymer composition.

The thickness of the sealing film is not critical to the present invention. The thickness can be controlled to attain a desired flexibility and/or cost in the resulting sheeting. Typically, it is less than the height of the structured elements. Typically, the height of the structured elements is less than about 500 micrometers, and preferably less than about 200 micrometers. Typically, the sealing film thickness is less than about 250 micrometers, preferably less than about 200 micrometers, and more preferably about 25–80 micrometers. The minimum thickness of the sealing film is generally dictated by extrusion techniques, and is typically greater than about 10 micrometers, and preferably, greater than about 25 micrometers. Such thin films can be prepared using the extrusion process detailed in copending U.S. patent application Ser. No. 08/626,709, entitled EXTRUDING THIN MULTIPHASE POLYMER FILMS (Attorney Docket No. 52496USA3A), filed on even date herewith.

Bonding Agent

The bonding agent is an oligomeric or polymeric material used to bond sealing film to a structured retroreflective film. The bonding agent is prepared from a bonding agent precursor that is applied as a fluid capable of flowing sufficiently so as to be coatable, and then solidifying to form a film. The solidification can be achieved by curing (i.e., polymerizing and/or crosslinking) or by both drying (e.g., or driving off a liquid) and curing. The bonding agent precursor can be an organic solvent-borne, water-borne, or 100% solids (i.e., a substantially solvent-free) composition. That is, the bonding agent may be formed from a 100% solids formulation or it may be coated out of a solvent (e.g., a ketone, tetrahydrofuran, or water) with subsequent drying and curing. Preferably, the bonding agent precursor is a 100% solids formulation, which is substantially solvent-free (i.e., less than about 1 wt-%). By this it is meant that there is less than about 1 wt-% nonreactive diluent (as defined below) present in the bonding agent precursor. Thus, the 100% solids bonding agent precursor can polymerize and/or crosslink using a wide variety of curing mechanisms (e.g., oxidative cure as a result of oxygen in the air, thermal cure, moisture cure, high energy radiation cure, condensation polymerization, addition polymerization, and combinations thereof), without driving off a solvent.

Using the bonding agent provides another advantage over typical thermal bonded, i.e., thermally embossed, retroreflective sheetings. In thermal bonding systems, the thermal energy and/or pressure can distort the structured elements in and near the bonds. Some of the materials useful as a bonding agent in the present invention are advantageous because they either do not rely on thermal curing, e.g., instead using radiation curable systems, or they use relatively low levels of thermal energy for drying such that the structured elements near the bonds are not distorted.

The bonding agent precursor is one that is capable of irreversibly forming a cured oligomeric/polymeric material and is often used interchangeably with the term "thermosetting" precursor. The term "thermosetting" precursor is used herein to refer to reactive systems that irreversibly cure upon the application of heat as well as other sources of energy, such as E-beam, ultraviolet, visible, etc., or with time upon the addition of a chemical catalyst, moisture, and the like. Thus, the term "reactive" means that the components react with each other (or self-react), and/or optionally, but preferably, with the sealing film and structured retroreflective film, by polymerizing, crosslinking, or both, using any of the mechanisms listed above.

Components selected for use in the bonding agent precursor interact with the sealing film and the structured retroreflective film to form a durable bond. The term "interact" refers to a variety of mechanisms of interaction, such as surface roughening, dissolution, or interpenetration of the polymer used in the sealing film and the structured retroreflective film. There could also be a covalent interaction (e.g., polymerizing and/or crosslinking) between components of the bonding agent precursor and the sealing film and structured retroreflective film. The degree of interaction, however, cannot be so great as to destroy the integrity of the retroreflective sheeting.

Certain components can be used to enhance durability and weatherability of the retroreflective sheeting. In addition, the bonding agent precursor preferably has suitable rheology for pattern coating. Additional opacity can be obtained by this invention because components of the bonding agent precursor can suspend or disperse various pigments at useful concentrations.

Materials suitable for forming the bonding agent are bonding agent precursors comprising reactive components, i.e., materials capable of being crosslinked and/or polymerized by a wide variety of mechanisms (e.g., oxidative cure, condensation, moisture cure, radiation or thermal cure of free radical systems, etc., or combinations thereof). Examples include, but are not limited to: amino resins (i.e., aminoplast resins) such as alkylated urea-formaldehyde resins, melamine-formaldehyde resins, and alkylated benzoguanamine-formaldehyde resins; acrylate resins (including acrylates and methacrylates) such as vinyl acrylates, acrylated epoxies, acrylated urethanes, acrylated polyesters, acrylated acrylics, acrylated polyethers, acrylated oils, and acrylated silicones; alkyd resins such as urethane alkyd resins; polyester resins; reactive urethane resins; phenol formaldehyde resins (i.e., phenolic resins) such as resole and novolac resins; phenolic/latex resins; epoxy resins such as bisphenol epoxy resins; isocyanates; isocyanurates; polysiloxane resins including alkylalkoxysilane resins; reactive vinyl resins; and the like. As used herein, "resins" or "resin systems" refer to polydisperse systems containing monomers, oligomers, polymers, or combinations thereof.

Such reactive bonding agent precursor components are capable of being cured by a variety of mechanisms (e.g., condensation or addition polymerization) using, for example, thermal energy, radiation energy, etc. Rapidly acting forms of radiation energy (e.g., requiring application for less than five minutes and preferably for less than five seconds) are particularly preferred. Electron beam (E-beam) radiation is especially desired because of its ability to penetrate heavily pigmented coatings, its speed and efficient use of applied energy, and its ease of control. Other useful forms of radiation energy include ultraviolet/visible light, nuclear radiation, infrared, and microwave radiation. Depending on the particular curing mechanism, the bonding agent precursor can further include a catalyst, initiator, or curing agent to help initiate and/or accelerate the polymerization and/or crosslinking process.

Reactive bonding agent precursor components capable of being cured by thermal energy and/or time with the addition of catalysts include, for example, phenolic resins such as resole and novolac resins; epoxy resins such as bisphenol A epoxy resins; and amino resins such as alkylated urea-formaldehyde resins, melamine-formaldehyde resins, and alkylated benzoguanamine-formaldehyde resins. Bonding agent precursors containing reactive components such as these can include free radical thermal initiators, acid catalysts, etc., depending on the resin system. Examples of thermal free radical initiators include peroxides such as benzoyl peroxide and azo compounds. Typically, such reactive bonding agent precursors components need temperatures greater than room temperature (i.e., 25°–30° C.) to cure, although room-temperature curable systems are known.

Resole phenolic resins have a molar ratio of formaldehyde to phenol, based upon weight, of greater than or equal to about 1:1, typically about 1.5:1.0 to about 3.0:1.0. Novolac resins have a molar ratio of formaldehyde to phenol, based upon weight, of less than about 1:1. Examples of commercially available phenolic resins include those known by the designations DUREZ and VARCUM from Occidental Chemicals Corp., Dallas, Tex.; RESINOX from Monsanto, St. Louis, Mo.; and AEROFENE and AEROTAP from Ashland Chemical Co., Columbus, Ohio.

Epoxy resins have an oxirane and are polymerized by ring opening. They can vary greatly in the nature of their backbones and substituent groups. For example, the backbone may be of any type normally associated with epoxy resins, and the substituent groups may be any group free of an active hydrogen atom that is reactive with an oxirane ring at room temperature. Representative examples of acceptable substituents include halogens, ester groups, ether groups, sulfonate groups, siloxane groups, nitro groups, and phosphate groups. One of the most commonly available epoxy resins is the reaction product of diphenylol propane (i.e., bisphenol A) and epichlorhydrin to form 2,2-bis[4-(2,3-epoxypropoxy)phenyl]propane (a diglycidyl ether of bisphenol A). Such materials are commercially available under the trade designations EPON (e.g., EPON 828, 1004, and 1001F) from Shell Chemical Co., and DER (e.g., DER 331, 332, and 334) from Dow Chemical Co., Midland, Mich. Other suitable epoxy resins include glycidyl ethers of phenol formaldehyde novolac available under the trade designation DEN (e.g., DEN 431 and 428) from Dow Chemical Co.

Amino resins (i.e., aminoplast resins) are the reaction product of formaldehyde and an amine. The amine is typically urea or melamine. The most common amino resins are the alkylated urea-formaldehyde resins and melamine-formaldehyde resins, although alkylated benzoguanamine-formaldehyde resins are also known. Melamine-formaldehyde resins are typically used where outdoor durability and chemical resistance are desired. Typically, however, amino resins are not used by themselves because they tend to be brittle. Thus, they are often combined with other resin systems. For example, they can be combined with alkyds, epoxies, acrylics, or other resins that contain functional groups that will react with the amino resin, to take advantage of the good properties of both resin systems.

More preferred bonding agent precursors are those that are curable using radiation. These are referred to herein as radiation curable materials. As used herein, "radiation cure" or "radiation curable" refers to curing mechanisms that involve polymerization and/or crosslinking of resin systems upon exposure to ultraviolet radiation, visible radiation, electron beam radiation, or combinations thereof, optionally with the appropriate catalyst or initiator. Typically, there are two types of radiation cure mechanisms that occur—free radical curing and cationic curing. These usually involve one stage curing or one type of curing mechanism. Mixtures of free radical and cationic materials may also be cured to impart desired properties from both systems. Also possible are dual-cure and hybrid-cure systems, as discussed below.

In cationic systems, cationic photoinitiators react upon exposure to ultraviolet/visible light to decompose to yield an acid catalyst. The acid catalyst propagates a crosslinking reaction via an ionic mechanism. Epoxy resins, particularly cycloaliphatic epoxies, are the most common resins used in cationic curing, although aromatic epoxies and vinyl ether based oligomers can also be used. Furthermore, polyols can be used in cationic curing with epoxies as chain-transfer agents and flexibilizers. Also, epoxysiloxanes as disclosed in Eckberg et al., "UV Cure of Epoxysiloxanes," *Radiation Curing in Polymer Science and Technology: Volume IV, Practical Aspects and Applications,* Fouassier and Rabek, eds., Elsevier Applied Science, N.Y., Chapter 2, 19–49 (1993) can be cured using a cationic photoinitiator. The cationic photoinitiators include salts of onium cations, such as arylsulfonium salts, as well as organometallic salts. Examples of cationic photoinitiators are disclosed in U.S. Pat. Nos. 4,751,138 (Tumey et al.) and 4,985,340 (Palazzotti), and European Patent Application Nos. 306,161 and 306,162. A suitable photoinitiator for epoxysiloxanes is the photoactive iodonium salt available under the trade designation UV9310C from GE Silicones, Waterford, N.Y.

In free radical systems, radiation provides very fast and controlled generation of highly reactive species that initiate polymerization of unsaturated materials. Examples of free radical curable materials include, but are not limited to, acrylate resins, aminoplast derivatives having pendant alpha, beta-unsaturated carbonyl groups, isocyanurate derivatives having at least one pendant acrylate group, isocyanate derivatives having at least one pendant acrylate group, unsaturated polyesters (e.g., the condensation products of organic diacids and glycols), polyene/thiol/silicone systems, and other ethylenically unsaturated compounds, and mixtures and combinations thereof. Such radiation curable systems are discussed in greater detail in Allen et al., "UV and Electron Beam Curable Pre-Polymers and Diluent Monomers: Classification, Preparation and Properties," *Radiation Curing in Polymer Science and Technology: Volume I, Fundamentals and Methods,* Fouassier and Rabek, eds., Elsevier Applied Science, N.Y., Chapter 5, 225–262 (1993); *Federation Series on Coatings Technology: Radiation Cured Coatings,* Federation of Societies for Coatings Technology, Philadelphia, Pa., pages 7–13 (1986); and *Radiation Curing Primer I: Inks, Coatings, and Adhesives,* RadTech International North America, Northbrook, Ill., pages 45–53 (1990).

Free radical curable systems can be cured using radiation energy, although they can be cured using thermal energy, as long as there is a source of free radicals in the system (e.g., peroxide or azo compound). Thus, the phrase "radiation curable," and more particularly the phrase "free radical curable," include within their scope systems that also can be cured using thermal energy and that involve a free radical curing mechanism. In contrast, the phrase "radiation cured" refers to systems that have been cured by exposure to radiation energy.

Suitable acrylate resins for use in the present invention include, but are not limited to, acrylated urethanes (i.e., urethane acrylates), acrylated epoxies (i.e., epoxy acrylates), acrylated polyesters (i.e., polyester acrylates), acrylated acrylics, acrylated silicones, acrylated polyethers (i.e., polyether acrylates), vinyl acrylates, and acrylated oils. As used herein, the terms "acrylate" and "acrylate-functional" include both acrylates and methacrylates, whether they be monomers, oligomers, or polymers.

Acrylated urethanes are diacrylate esters of hydroxy terminated NCO extended polyesters or polyethers. They can be aliphatic or aromatic, although acrylated aliphatic urethanes are preferred because they are less susceptible to weathering. Examples of commercially available acrylated urethanes include those known by the trade designations PHOTOMER (e.g., PHOTOMER 6010) from Henkel Corp., Hoboken, N.J.; EBECRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weight diluted with tetraethylene glycol diacrylate), EBECRYL 6602 (trifunctional aromatic urethane acrylate of 1300 molecular weight diluted with trimethylolpropane ethoxy triacrylate), and EBECRYL 8402 (aliphatic urethane diacrylate of 1000 molecular weight) from UCB Radcure Inc., Smyrna, GA; SARTOMER (e.g., SARTOMER 9635, 9645, 9655, 963-B80, 966-A80) from Sartomer Co., West Chester, Pa.; and UVITHANE (e.g., UVITHANE 782) from Morton International, Chicago, Ill.

Acrylated epoxies are diacrylate esters of epoxy resins, such as the diacrylate esters of bisphenol A epoxy resin. Examples of commercially available acrylated epoxies include those known by the trade designations EBECRYL 600 (bisphenol A epoxy diacrylate of 525 molecular weight), EBECRYL 629 (epoxy novolac acrylate of 550 molecular weight), and EBECRYL 860 (epoxidized soya oil acrylate of 1200 molecular weight) from UCB Radcure Inc., Smyrna, Ga.; and PHOTOMER 3016 (bisphenol A epoxy diacrylate), PHOTOMER 3038 (epoxy acrylate/tripropylene glycol diacrylate blend), PHOTOMER 3071 (modified bisphenol A acrylate), etc. from Henkel Corp., Hoboken, N.J.

Acrylated polyesters are the reaction products of acrylic acid with a dibasic acid/aliphatic/diol-based polyester. Examples of commercially available acrylated polyesters include those known by the trade designations PHOTOMER 5007 (hexafunctional acrylate of 2000 molecular weight), PHOTOMER 5018 (tetrafunctional acrylate of 1000 molecular weight), and other acrylated polyesters in the PHOTOMER 5000 series from Henkel Corp., Hoboken, N.J.; and EBECRYL 80 (tetrafunctional modified polyester acrylate of 1000 molecular weight), EBECRYL 450 (fatty acid modified polyester hexaacrylate), and EBECRYL 830 (hexafunctional polyester acrylate of 1500 molecular weight) from UCB Radcure Inc., Smyrna, Ga.

Acrylated acrylics are acrylic oligomers or polymers that have reactive pendant or terminal acrylic acid groups capable of forming free radicals for subsequent reaction. Examples of commercially available acrylated acrylics include those known by the trade designations EBECRYL 745, 754, 767, 1701, and 1755 from UCB Radcure Inc., Smyrna, Ga.

Acrylated silicones, such as room temperature vulcanized silicones, are silicone-based oligomers or polymers that have reactive pendant or terminal acrylic acid groups capable of forming free radicals for subsequent reaction. These and other acrylates are discussed in Allen et al., "UV and Electron Beam Curable Pre-Polymers and Diluent Monomers: Classification, Preparation and Properties," *Radiation Curing in Polymer Science and Technology: Volume I. Fundamentals and Methods,* Fouassier and Rabek, eds., Elsevier Applied Science, N.Y., Chapter 5, 225–262 (1993); *Federation Series on Coatings Technology: Radiation Cured Coatings,* Federation of Societies for Coatings Technology, Philadelphia, Pa., pages 7–13 (1986); and *Radiation Curing Primer I: Inks, Coatings, and Adhesives,* RadTech International North America, Northbrook, Ill., pages 45–53 (19906).

Isocyanurate derivatives having at least one pendant acrylate group and isocyanate derivatives having at least one pendant acrylate group are further described in U.S. Pat. No. 4,652,274 (Boetcher et al.). Examples of isocyanurate resins with acrylate groups include a triacrylate of tris(hydroxy ethyl) isocyanurate.

Radiation curable aminoplast resins have at least one pendant alpha, beta-unsaturated carbonyl group per molecule or oligomer. These unsaturated carbonyl groups can be acrylate, methacrylate, or acrylamide type groups. Examples of resins with acrylamide groups include N-(hydroxymethyl)-acrylamide, N,N'-oxydimethylenebisacrylamide, ortho- and para-acrylamidomethylated phenol, acrylamidomethylated phenolic novolac, glycoluril acrylamide, acrylamidomethylated phenol, and combinations thereof. These materials are further described in U.S. Pat. Nos. 4,903,440 (Larson et al.), 5,055,113 (Larson et al.), and 5,236,472 (Kirk et al.).

Other suitable ethylenically unsaturated resins include monomeric, oligomeric, and polymeric compounds, typically containing ester groups, amide groups, and acrylate groups. Such ethylenically unsaturated compounds preferably have a molecular weight of less than about 4,000. They are preferably esters made from the reaction of compounds containing aliphatic monohydroxy groups or aliphatic polyhydroxy groups and unsaturated carboxylic acids, such as acrylic acid, methacrylic acid, itaconic acid, maleic acid, and the like. Representative examples of acrylate resins are listed elsewhere herein. Other ethylenically unsaturated resins include monoallyl, polyallyl, and polymethallyl esters and amides of carboxylic acids, such as diallyl phthalate, diallyl adipate, and N,N-diallyladipamide, as well as styrene, divinyl benzene, vinyl toluene. Still others include tris(2-acryloyl-oxyethyl)-isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

In dual-cure resin systems, the polymerization or crosslinking occur in two separate stages, via either the same or different reaction mechanisms. In hybrid-cure resin systems, two mechanisms of polymerization or crosslinking occur at the same time on exposure to ultraviolet/visible or E-beam radiation. The chemical curing mechanisms that can occur in these systems include, but are not limited to, radical polymeriziation of acrylic double bonds, radical polymerization of unsaturated polyesters of styrene or other monomers, air drying of allyl functions, cationic curing of vinyl ethers or epoxies, condensation of isocyanates, and acid-catalyzed thermal curing. Thus, the dual-cure and hybrid-cure systems can combine radiation curing with thermal curing, or radiation curing with moisture curing, for example. A combination of E-beam curing with ultraviolet/visible curing is also possible. Combining curing mechanisms can be accomplished, for example, by mixing materials with two types of functionality on one structure or by mixing different materials having one type of functionality. Such systems are discussed in Peeters, "Overview of Dual-Cure and Hybrid-Cure Systems in Radiation Curing," *Radiation Curing in Polymer Science and Technology: Volume III. Polymer Mechanisms,* Fouassier and Rabek, eds., Elsevier Applied Science, N.Y., Chapter 6, 177–217 (1993).

Of the radiation curable materials, free radical curable materials are preferred. Of these, the acrylates are particularly preferred for use in the bonding agent precursors of the present invention. Examples of such materials include, but are not limited to, mono- or multi-functional acrylates (i.e., acrylates and methacrylates), acrylated epoxies, acrylated polyesters, acrylated aromatic or aliphatic urethanes, acrylated acrylics, acrylated silicones, etc., and combinations or blends thereof These can be monomers or oligomers (i.e., moderately low molecular weight polymers typically containing 2–100 monomer units, and often 220 monomer units) of varying molecular weight (e.g., 100–2000 weight average molecular weight). Preferred bonding agent precursors include acrylated epoxies, acrylated polyesters, acrylated aromatic or aliphatic urethanes, and acrylated acrylics. More preferred bonding agent precursors include acrylated aromatic or aliphatic urethanes, and most preferred bonding agent precursors include acrylated aliphatic urethanes.

Free radical radiation curable systems often include oligomers and/or polymers (also often referred to as film formers) that form the backbone of the resultant cured material, and reactive monomers (also often referred to as reactive diluents) for viscosity adjustment of the curable composition. Although the film formers are typically oligomeric or polymeric materials, some monomeric materials are also capable of forming a film. Typically, systems such as these require the use of ultraviolet/visible or E-beam radiation. Ultraviolet/visible curable systems also typically include a photoinitiator. Water or organic solvents can also be used to reduce the viscosity of the system (therefore acting as unreactive diluents), although this typically requires thermal treatment to flash off the solvent. Thus, the bonding agent precursors of the present invention preferably do not include water or organic solvents. That is, they are preferably 100% solids formulations.

Preferred bonding agent precursors of the present invention include a reactive diluent and a film former. The reactive diluent includes at least one mono-or multi-functional monomeric compound. As used herein, monofunctional means that compound contains one carbon-carbon double bond, and multi-functional means that the compound contains more than one carbon-carbon double bond or another chemically reactive group that can crosslink through condensation. Examples of resins with a carbon-carbon double bond and another chemically reactive group include isocyanatoethyl methacrylate, isobutoxymethyl acrylamide, and methacryloxy propyl trimethoxy silane. Suitable reactive diluents are those typically used in radiation curable systems for controlling viscosity. They are preferably acrylates, although non-acrylates such as n-vinyl pyrrolidone, limonene, and limonene oxide, can also be used, as long as the monomers are ethylenically unsaturated, which provides for their reactivity. The film former includes at least one radiation curable material, such as the mono- or multi-functional oligomeric compounds typically used in radiation curable systems, although thermoplastic polymers can also be used. These thermoplastic polymers may or may not be reactive with the reactive diluent or self-reactive (e.g., internally crosslinkable).

Preferably, the bonding agent precursor includes at least one monofunctional monomeric compound and at least one multifunctional oligomeric compound. Most preferably, such bonding agent precursors include at least one monofunctional monomeric acrylate having a molecular weight of no greater than about 1000 preferably, about 100–1000) and at least one multifunctional oligomeric acrylated urethane having a molecular weight of at least about 500, preferably, about 500–7000, and more preferably, about 1000–2000.

Monofunctional monomers typically tend to lower the viscosity of the blend and provide faster penetration into the sealing film and/or structured retroreflective film. Multifunctional monomers and oligomers (e.g., diacrylates and triacrylates) typically tend to provide more crosslinked, stronger bonds between layers and within the bonding agent. Also, depending on their structures, the multifunctional monomers and oligomers can impart flexibility or rigidity to the bonding agent. Acrylated oligomers, preferably acrylated urethane oligomers, impart desirable properties to the coating, such as toughness, hardness, and flexibility.

Examples of suitable monofunctional monomers include, but are not limited to, ethyl acrylate, methyl methacrylate, isooctyl acrylate, oxethylated phenol acrylate, isobornyl acrylate, 2-ethylhexyl acrylate, 2-phenoxyethyl acrylate, 2-(ethoxyethoxy)ethyl acrylate, ethylene glycol methacrylate, tetrahydroxy furfuryl acrylate (THF acrylate), caprolactone acrylate, and methoxy tripropylene glycol monoacrylate. Examples of suitable multifunctional monomers include, but are not limited to, triethylene glycol diacrylate, pentaerythritol triacrylate, glycerol triacrylate, glycerol trimethacrylate, glyceryl propoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, polyethylene glycol diacrylate, pentaerythritol tetraacrylate, pentaerythritol tetramethacrylate, and 1,6-hexane diacrylate. Other mono- and multi-functional monomers include vinyl acetate, n-vinyl formamide, and others listed below in Table 1. The monomers are available under the trade designations EBECRYL from UCB Radcure Inc., Smyrna, Ga., PHOTOMER from Henkel Corp., Hoboken, N.J., and SARTOMER from Sartomer Co., West Chester, Pa. Limonene oxide is from Aldrich Chemical Co., Milwaukee, Wis. The n-vinyl pyrrolidinone is from Kodak, Rochester, N.Y.

Examples of suitable acrylated oligomers include, but are not limited to, acrylated epoxies, acrylated polyesters, acrylated aromatic or aliphatic urethanes, acrylated silicones, acrylated polyethers, vinyl acrylates, acrylated oils, and acrylated acrylics. Of these, acrylated aromatic or aliphatic urethanes are preferred, and acrylated aliphatic urethanes are more preferred because of their flexibility and weatherability. Examples of some acrylated aliphatic urethanes (i.e., aliphatic urethane acrylates) include those available under the trade designations PHOTOMER 6010 (MW=1500), from Henkel Corp., Hoboken, N.J.; EBECRYL 8401 (MW= 1000) and EBECRYL 8402 (MW=1000, urethane diacrylate), from UCB Radcure Inc., Smyrna, Ga.; S-9635, S-9645, and S-9655, all of which contain 25% by weight isobornyl acrylate, and are available from Sartomer Co., West Chester, Pa.; S-963-B80, which contains 20% by weight 1,6-hexanediol diacrylate and is available from Sartomer Co.; and S-966-A80, which contains 20% by weight tripropylene glycol diacrylate and is available from Sartomer Co.

Preferred reactive monomers (i.e., reactive diluents) are those that interact with (e.g., dissolve or swell) the structured retroreflective film (e.g., polycarbonate) and the sealing film (e.g., AES and/or ASA films). Particular monomer/film interactions can be readily screened for interaction by application of a quantity of the monomer solution to the surface of the film. Priola et al., *Proceedings of the XIII International Conference in Organic Coatings Science and Technology,* Athens, Greece, Jul. 7–11, 1987, pp. 308–318, discloses a watch glass test suitable for this purpose. A positive response is a hazing or dissolving of the substrate in question upon exposure to a drop of the monomer, which indicates that the monomer penetrates or swells the substance, or interacts in some other fashion with the substance. Examples of monomers that interact with a film made from either the AES material available under the trade designation CENTREX 833 or polycarbonate are given below in Table 1.

TABLE 1

Screening of Monomers for Compatibility
With Polycarbonate and AES/ASA

| Monomer | Type of Material | CENTREX 833 | Poly-carbonate |
|---|---|---|---|
| EBECRYL 110 | Oxethylated phenol acrylate | yes | yes |
| PHOTOMER 4028 | Bisphenol A ethoxylate diacrylate | none | yes |
| PHOTOMER 4072 | Trimethyol propane propoxylate triacrylate | none | trace |
| PHOTOMER 4149 | Trimethylol propane ethoxylate triacrylate | trace | trace |
| PHOTOMER 8061 | Methoxy tripropylene glycol monoacrylate | trace | yes |
| PHOTOMER 8149 | Methoxy ethoxylated trimethylpropane diacrylate | trace | yes |
| SARTOMER 213 | 1,4-Butanediol diacrylate | yes | yes |
| SARTOMER 238 | 1,6-Hexanediol diacrylate | yes | yes |
| SARTOMER 256 | 2(Ethoxy-ethoxy) ethyl acrylate | yes | yes |
| SARTOMER 268 | Tetraethylene glycol diacrylate | yes | trace |
| SARTOMER 272 | Triethylene glycol diacrylate | yes | yes |
| SARTOMER 285 | Tetrahydroxy furfuryl acrylate | yes | yes |
| SARTOMER 306 | Tripropylene glycol diacrylate | trace | trace |
| SARTOMER 497 | n-Vinyl formamide | yes | yes |
| SARTOMER 506 | Isobornyl acrylate | none | yes |
| SARTOMER 9008 | Alkoxylated trifunctional acrylate | trace | none |
| +Limonene oxide | Limonene oxide | yes | yes |
| −Limonene oxide | Limonene oxide | yes | yes |
| NVP | n-Vinyl pyrrolidinone | yes | yes |

As stated above, a thermoplastic polymer can be used as the film former, either in addition to or in place of the mono- or multi-functional oligomers. Thus, many of the sealing film materials (e.g., the AES and/or ASA materials) discussed above can be used in the bonding agent precursor. Preferably, these are used in addition to the mono- or multi-functional oligomers as a secondary film former to control the viscosity and rheology of the bonding agent precursor and/or to help reduce the amount of shrinkage of the film. Pellets of the various ASA and/or AES resins available under the trade designation CENTREX, for example, are desirable because they will dissolve in a variety of monomers (e.g., reactive diluents), and are radiation curable (i.e., they crosslink upon exposure to ultraviolet/visible radiation). Other thermoplastic polymers can be used, however, that are not reactive either with the reactive diluents or self-reactive. For example, the substantially unreactive thermoplastic acrylate terpolymer used in the binder of U.S. Pat. No. 4,025,159 (McGrath) can be used in the bonding agent precursor of the present invention.

The bonding agent precursor may contain various solvents other than the diluent monomers discussed above to help solubilize the higher molecular weight reactive resins (e.g., the acrylated oligomers) and/or the thermoplastic polymers of the structured film and/or the sealing film. Such solvents are referred to as nonreactive diluents or nonreactive monomers as they do not significantly polymerize or crosslink with the reactive resins of the bonding agent precursor, for example, under the curing conditions of the method of the present invention. Suitable solvents for this purpose include various ketone solvents, tetrahydrofuran, xylene, and the like. Alternatively, and preferably, however, the bonding agent precursor is a 100% solids composition as defined above.

Colorants (i.e., pigments and dyes) can also be included in the bonding agent precursor if desired. Examples of suitable colorants include $TiO_2$, phthalocyanine blue, carbon black, basic carbonate white lead, zinc oxide, zinc sulfide, antimony oxide, zirconium oxide, lead sulfochromate, bismuth vanadate, bismuth molybdate, as well as other pigments, particularly opaque pigments disclosed in U.S. Pat. No. 5,272,562 (Coderre). The colorant can be used in an amount to impart the desired color, and can be added to the bonding agent precursor in a variety of ways. For example, the colorant may be included in the ASA and/or AES pellets as purchased. Typically, and preferably, a pigment is used in the form of a dispersion in, for example, neopentyl glycol diacrylate (available under the trade designation 9WJ, from Penn Color, Doylestown, Pa.).

Preferably, the bonding agent precursors include a reactive diluent in an amount of about 5–25 wt-%, based on the weight of the total bonding agent precursor. The amounts of the film former and optional pigment in the bonding agent precursor depends on the desired opacity, flexibility, viscosity, etc. Preferably, the bonding agent precursors include a film former in an amount of about 25–95 wt-%, and pigment in an amount of no greater than about 50 wt-%, based on the total weight of the bonding agent precursor.

A photoinitiator is typically included in ultraviolet/visible curable bonding agent precursors of the present invention. Illustrative examples of photopolymerization initiators (i.e., photoinitiators) include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. Such photoinitiators include those available under the trade designations DAROCUR 4265 (50:50 blend of 2-hydroxy-2-methyl-1-phenylpropan-1-one and 2,4,6-trimethylbenzoyldiphenylphosphine oxide) and CGI1700 (25:75 blend of bis(2,6-dimethoxybenzoyl)-2,4,4-trimethylpentylphosphine and 2-hydroxy-2-methyl-1-phenylpropan-1-one) available from Ciba-Geigy Corp., Hawthorne, N.Y. Typically, a photoinitiator is used in an amount to impart desired reaction rates. Preferably, it is used in an amount of about 0.01–5 wt-%, and more preferably about 0.1–1 wt-%, based on the total weight of the bonding agent precursor.

Other additives that can be included within the bonding agent precursor are fillers, defoamers, adhesion promoters, flattening agents, wetting agents, slip aids, stabilizers, plasticizers, adhesion promoters, etc. These can be reactive or nonreactive; however, they are typically nonreactive. Examples of reactive plasticizers are available under the trade designations SARBOX SB-600 and SB-510E35 from Sartomer Co. Typically, such additives are used in amounts to impart desired characteristics. Preferably, they are used in amounts of about 0.01–5 wt-%, and more preferably 0.1–1 wt-%, based on the total weight of the bonding agent precursor.

Any suitable method of applying the bonding agent precursor to the sealing film and/or the structured retroreflective film can be used in connection with the present invention. A continuous application of the bonding agent to the sealing film can be used for a structured retroreflective film with a raised ridge construction. Pattern coating of the bonding agent is preferred for applications where the sealing film is bonded directly to the structured retroreflective film. The choice of coating method will depend on the viscosity of the bonding agent precursor, the desired thickness of the coating, coating speed, etc. Suitable coating methods include knife coating, rod coating, gravure coating, notch bar coating, and screen printing. Some useful methods of applying a layer of the bonding agent used in the present invention are described in U.S. Pat. Nos. 4,327,130, 4,345,543, 4,387,124, and 4,442,144 (all to Pipkin).

The thickness of the bonding agent will depend on the viscosity and film build of the bonding agent precursor, the type of coater used, the desired final properties, and the configuration of the structured retroreflective film. One consideration is the need to provide hermetic bonds along the seal legs. That function will be driven in large part by the height of the structured elements. Typically, wet coating thicknesses of about 75 to about 300 micrometers are used, although 25 micrometers or less may be used, particularly if a raised structure is provided as depicted in FIGS. 5 and 7 (where the height of the structured elements may be less of a factor).

After the bonding agent precursor is coated onto the sealing film and/or structured retroreflective film, it is preferably exposed to an energy source to initiate cure. Examples of suitable and preferred energy sources include thermal energy and other forms of radiation energy. The amount of energy depends upon several factors such as the resin chemistry, the dimensions of the bonding agent precursor after it is coated, and the amount and type of optional additives, particularly pigment load.

For thermal energy, the temperature is about 30° C. to about 100° C. The exposure time can range from about 5 minutes to over 24 hours, longer times being appropriate for lower temperatures.

Suitable radiation energy sources for use in the invention include electron beam, ultraviolet light, visible light, or combinations thereof. Ultraviolet radiation refers to nonparticulate radiation having a wavelength within the range of about 200 nanometers to about 400 nanometers. Visible radiation refers to nonparticulate radiation having a wavelength within the range of about 400 nanometers to about 800 nanometers. The preferred radiation is E-beam because of the need to cure the bonding layer either through the structured retroreflective film or through the sealing film, or both. E-beam radiation, which is also known as ionizing radiation, can be used at an energy level of about 0.1–10 Mrad, preferably, at an energy level of about 3–8 Mrad, and more preferably, about 5–6 Mrad; and at an accelerating voltage level of about 75 KeV to about 5 meV, preferably, at an accelerating voltage level of about 100–300 KeV.

Overlay Materials

Overlay film 40 (FIG. 3) of the present invention is used to provide a barrier for foreign materials such as organic solvents, water, oil, dust, etc., from attacking the structured retroreflective film. Thus, the polymeric materials used in the overlay film should be generally resistant to degradation by weathering (e.g., UV light) and environmental attack so that the retroreflective sheeting can be used for generally long-term outdoor applications. They should have good adhesion to the polymeric material of the structured retroreflective film and should be light transmissible. Preferably, the polymeric materials used in the overlay film are substantially transparent. In some applications it is also necessary that the overlay have good adhesion to an ink used to provide graphics or a message to the sign. The polymeric materials used in the overlay film should also preferably retain their physical integrity at the temperatures at which they are applied to the structured retroreflective film.

Overlays for thermoplastic structured materials are typically bonded to the structured retroreflective film after it has been thermally molded. Typically, the overlay film is a thermoplastic material. Examples of polymers that can be used in the overlay film include, but are not limited to: fluorinated polymers such as poly(chlorotrifluoroethylene), which is available, for example, under the trade designation KEL-F800 from 3M Co., St. Paul, Minn., poly (tetrafluoroethylene-co-hexafluoropropylene), which is available, for example, under the trade designation EXAC FEP from Norton Performance, Brampton, Mass., poly (tetrafluoroethylene-co-perfluoro(alkyl)vinylether), which is available, for example, under the trade designation EXAC PEA from Norton Performance, and poly(vinylidene fluoride) or poly(vinylidene fluoride-co-hexafluoropropylene), which are available, for example, under the trade designation KYNAR from Pennwalt Corporation, Philadelphia, Pa.; ionomeric ethylene copolymers such as poly(ethylene-co-methacrylic acid) with sodium or zinc ions, which are available under the trade designations SURLYN-8920 and SURLYN-9910 from E.I. DuPont de Nemours, Wilmington, Del.; low density polyolefins such as low density polyethylene, linear low density polyethylene, and very low density polyethylene; plasticized vinyl halide polymers such as plasticized poly (vinylchloride); polyethylene copolymers including acid functional polymers such as poly(ethylene-co-acrylic acid) and poly(ethylene-co-methacrylic acid), poly(ethylene-co-maleic acid), and poly(ethylene-co-fumaric acid); acrylic functional polymers such as polymethylmethacrylate, poly (ethylene-co-alkylacrylates) where the alkyl group is methyl, ethyl, propyl, butyl, etc., or $CH_3(CH_2)_n$—where n is 0–12, and poly(ethylene-co-vinylacetate); and aliphatic and aromatic polyurethanes derived from diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, polydiols such as polypentylene adipate glycol, polytetramethylene ether glycol, polyethylene glycol, polycaprolactone diol, poly-1,2-butylene oxide glycol, and combinations of these polydiols, and chain extenders such as butanediol or hexanediol. Commercially available urethane polymers include those available under the trade designations PN-03 or 3429 from Morton International Inc., Seabrook, N.H., or X-4107 from B.F. Goodrich Company, Cleveland, Ohio.

Combinations of the above polymers also may be used in the overlay film. Preferred polymers for the overlay film include fluorinated polymers such as poly(vinylidene fluoride) (PVDF), acrylic functional polymers such as polymethylmethacrylate (PMMA), and combinations thereof. A particularly preferred group of polymers include blends of PVDF and PMMA, which contain about 60–95 weight percent (wt-%) PMMA and about 5–40 wt-% PVDF. In these blends, the PMMA contributes to the durability of the overlay film whereas the PVDF contributes to the chemical (e.g., organic solvent) stability and flexibility of the overlay film. The PMMA may also be impact modified with, for example, a butyl acrylate rubber; however, preferably, the PMMA is not impact modified. Examples of impact modified PMMA's include those available under the trade designation CP924 from ICI Polymers, Wilmington, Del., which can be obtained with the benzotriazole UV absorber TINUVIN 900. Such nonimpact-modified PMMA materials are also referred to as "straight" PMMA. Suitable sources of "straight" PMMA include those available under the trade designation VO-45 from AtoHaas North America Inc., Bristol, Pa., and CP81 acrylic from ICI Polymers, Wilmington, Del. PVDF materials are available under the trade designations SOLVEY and SOLEF from Soltex Polymer Corp., Houston, Tex., and KYNAR from Elfatochem North America, Inc., Philadelphia, Pa. These polymers are preferred for one or more of the following reasons: suitable mechanical properties; good adhesion to the structured retroreflective film; clarity; enhanced solvent inertness; and environmental stability.

The overlay film can be a single layer or a multilayer film as desired, typically having a thickness of about 10–200 micrometers. Additionally, the adhesion between the overlay film and the structured retroreflective film can be improved by placing a thin tie-layer (not shown in FIG. 3) between the structured retroreflective film and the overlay. Alternatively, or in addition, some type of surface treatment method may be used to enhance adhesion.

The polymeric material used in the overlay film of the present invention can include the additives discussed above with respect to the structured layer. That is, the overlay film can include acid scavengers, UV absorbers, as well as colorants, light stabilizers, lubricants, and the like. The use of a UV absorber is particularly advantageous in the overlay film.

EXAMPLES

Features and advantages of the retroreflective sheetings according to the present invention are further illustrated in the example. It is recognized, however, that while the example serves this purpose, the particular ingredients and amounts used, as well as other conditions and details, are not to be construed in a manner that would unduly limit the scope of this invention. The following test was used to evaluate samples of cube-corner retroreflective sheetings of the present invention.

Z-Peel Test

The tensile bond Z-peel test is based on ASTM D 952-93. The specimen to be tested is attached between two metal fixtures. For the purposes of the following examples, the test was set up using an upper fixture that was a cubic block of steel 25.4 millimeters on each edge presenting a 6.5 square centimeter surface. A lower fixture was a 1.6 millimeter thick plate of aluminum 5×30.5 centimeters. For the test, a 30 millimeter square piece of the retroreflective sheeting of this invention was covered on the top with a layer of a suitable pressure sensitive tape such as SCOTCH Brand Adhesive Tape No. 419 (commercially available from 3M Company, St. Paul, Minn.), and on the bottom with a pressure sensitive adhesive having a 93:7 ratio of isooctyl acrylate-acrylic acid copolymer crosslinked with a bisamide crosslinker such as disclosed in U.S. Pat. No. 4,418,120 (Kealy et al.) with an intrinsic viscosity of 1.5–1.7 before crosslinking as measured by a modified Ostwald 50 viscometer at 20° C. using ASTM D446-93 test method ("93:7 adhesive"). The No. 419 adhesive tape was conditioned by storing in a desiccator containing calcium carbonate for at least 24 hours prior to use. The sheeting was placed, sealing film side down on the center of the aluminum plate and the metal block was placed on the top side of the sheeting. The sheeting was then trimmed around the edges of the upper block so that a 25.4×25.4 millimeter square of the sample was tested. The assembled sandwich was then compressed with a force of 1900 Newtons for 60 seconds. The steel cube was secured in the upper jaw of a standard tensile testing machine and the aluminum plate was secured along two sides in a lower gripping fixture of the tester. The jaws were rapidly separated at 50 centimeters/minute and the force versus displacement curve was recorded and the peak force was reported.

Example 1

Retroreflective Sheeting Having Bonding Agent Between Cube-Corner Elements and Sealing Film Molten polycarbonate resin (MAKROLON 2407 supplied by Mobay Corp., Pittsburgh, Pa.) was cast onto a heated microstructured nickel tooling containing microcube prism recesses having a depth of approximately 175 micrometers. The microcube recesses were formed as matched pairs of cube corner elements with the optical axis canted or tilted away from the primary groove, as generally described in U.S. Pat. No. 4,588,258 (Hoopman). In addition, 175 micrometers grooves were cut into the tooling at 3 millimeter spacing in one direction and 6 millimeter spacing 90 degrees in the other direction to form a grid like pattern of rectangles. This yields a tool which produces cube corner sheeting with raised ridges as taught in FIG. 12 of PCT Application No. WO 95/11469 (Benson et al.). The nickel tooling thickness was 508 micrometers and the tooling was heated to 216° C. Molten polycarbonate at a temperature of 288° C. was cast onto the tooling at a pressure of approximately $1.03 \times 10^7$ Pascals to $1.38 \times 10^7$ Pascals for 0.7 second in order to replicate the microcube recesses. Coincident with filling the cube recesses, additional polycarbonate was deposited in a continuous layer above the tooling with a thickness of approximately 175 micrometers. The total cube-corner film was approximately 525 micrometers (ridge+cube+land).

The tooling was then cooled with room temperature air for 18 seconds to a temperature of about 70°–90° C. allowing the polycarbonate to solidify. The sample was then removed from the microstructured tooling.

A sealing film with a nominal thickness of 50 micrometers was made by the methods described in copending U.S. patent application Ser. No. 08/626,709, entitled EXTRUDING THIN MULTIPHASE POLYMER FILMS (Attorney Docket No. 52496USA3A), filed on even date herewith. The resin used was CENTREX 833 (an ASA/AES terpolymer blend).

The sealing film was coated using a notch bar coater with the gap set to 25 micrometers. The solution used to coat the sealing film was prepared by combining the following components:

| Ingredient | Parts by Weight |
| --- | --- |
| EBECRYL 8402 (aliphatic urethane diacrylate) from UCB Radcure Inc., Smyrna, GA | 50 |
| TiO$_2$ dispersed in neopentyl glycol diacrylate (Dispersion 9WJ) from Penn Color, Doylestown, PA | 25 |
| THF acrylate (SARTOMER 285) from Sartomer Co., West Chester, PA | 25 |

The coated film was then laminated to the raised ridge cube sheeting and passed through an E-beam (irradiated by a 175 KeV electron beam using an Energy Sciences Inc., Electrocurtain Model CB40 to give a dosage of 4 Mrad). Curing was through the sealing film side.

A control sample was made by heat laminating the sealing film to the raised ridges of the cube sheeting. No bonding agent was used.

Both samples were then tested for bond strength according to the Z-peel test using six replicates. The peel strength for the radiation cured sample using the bonding agent was 166% greater than that of the control.

The patents, patent documents, and publications cited herein are incorporated by reference in their entirety, as if each were individually incorporated by reference. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A retroreflective sheeting comprising:
   a) a structured retroreflective film having a front surface and a back surface comprising an array of structured elements protruding from the back surface, wherein incident light enters the sheet by the front surface;
   b) a thermoplastic sealing film located proximate the structured elements; and
   c) a bonding agent layer between the sealing film and the structured retroreflective film, wherein the bonding agent forms bonds between the sealing film and the structured retroreflective film without indentations or discontinuities in the sealing film at the bonds and without distorted structured elements in and near the bonds.

2. A retroreflective sheeting according to claim 1, wherein the bonding agent forms a discontinuous layer between the sealing film and the structured retroreflective film.

3. A retroreflective sheeting according to claim 2, wherein the discontinuous layer forms a repeating pattern.

4. A retroreflective sheeting according to claim 2, wherein the discontinuous layer of bonding agent occupies up to about 50% or less of the interface between the sealing film and the structured retroreflective film.

5. A retroreflective sheeting according to claim 2, wherein the discontinuous layer of bonding agent occupies up to about 30% or less of the interface between the sealing film and the structured retroreflective film.

6. A retroreflective sheeting according to claim 2, wherein the discontinuous layer of bonding agent occupies up to about 20% or less of the interface between the sealing film and the structured retroreflective film.

7. A retroreflective sheeting according to claim 1, further comprising a raised structure between the structured retroreflective film and the sealing film, wherein the raised structure spaces the sealing film away from contact with the structured elements.

8. A retroreflective sheeting according to claim 7, wherein the raised structure further comprises a plurality of raised ridges.

9. A retroreflective sheeting according to claim 8, wherein the raised ridges are provided in a pattern.

10. A retroreflective sheeting according to claim 1, wherein the bonding agent is prepared from a bonding agent precursor comprising a thermally curable component.

11. A retroreflective sheeting according to claim 1, wherein the bonding agent is prepared from a bonding agent precursor comprising a radiation curable component.

12. A retroreflective sheeting according to claim 11, wherein the radiation curable component comprises a cationic curable resin, a free radical curable resin, or mixtures thereof.

13. A retroreflective sheeting according to claim 11, wherein the radiation curable component comprises a dual-cure resin or a hybrid-cure resin.

14. A retroreflective sheeting according to claim 11, wherein the radiation curable component comprises an acrylate.

15. A retroreflective sheeting according to claim 14, wherein the acrylate is selected from the group consisting of an acrylated epoxy, an acrylated polyester, an acrylated aromatic or aliphatic urethane, an acrylated acrylic, an acrylated silicone, an acrylated polyether, a vinyl acrylate, and an acrylated oil.

16. A retroreflective sheeting according to claim 15, wherein the acrylate is an acrylated aliphatic or aromatic urethane.

17. A retroreflective sheeting according to claim 16, wherein the acrylate is an acrylated aliphatic urethane.

18. A retroreflective sheeting according to claim 17, wherein the bonding agent precursor further comprises a monofunctional or multifunctional reactive monomer.

19. A retroreflective sheeting according to claim 18, wherein the monofunctional or multifunctional reactive monomer is an acrylate monomer.

20. A retroreflective sheeting comprising:
   a) a structured retroreflective film having a front surface and a back surface comprising an array of structured elements protruding from the back surface, wherein incident light enters the sheet by the front surface;
   b) a thermoplastic sealing film located proximate the structured elements; the sealing film including a textured raised structure; and
   c) a bonding agent layer located between the textured raised structure and the structured retroreflective film, wherein the bonding agent bonds the textured raised structure to the structured retroreflective film, and further wherein the bonding agent is prepared from a radiation curable bonding agent precursor comprising a reactive diluent and a film former.

21. A retroreflective sheeting according to claim 20, wherein the reactive diluent comprises a monofunctional or multifunctional acrylate monomer.

22. A retroreflective sheeting according to claim 21, wherein the film former comprises a thermoplastic polymer.

23. A retroreflective sheeting according to claim 21, wherein the film former comprises a monofunctional or multifunctional acrylate oligomer.

24. A retroreflective sheeting according to claim 23, wherein the radiation curable bonding agent precursor further comprises a multiphase styrenic thermoplastic copolymer.

25. A method of manufacturing a retroreflective sheeting comprising the steps of:
   a) providing a thermoplastic structured retroreflective film having a front surface and a back surface comprising an array of structured elements protruding from the back surface, wherein incident light enters the sheet by the front surface;
   b) providing a thermoplastic sealing film;
   c) applying a fluid bonding agent precursor to the thermoplastic structured retroreflective film, the thermoplastic sealing film, or both;
   d) contacting the thermoplastic sealing film with the structured retroreflective film while the bonding agent precursor is a fluid such that the thermoplastic sealing film is proximate the structured elements with the bonding agent precursor therebetween; and
   e) solidifying the fluid bonding agent precursor to form bonds between the sealing film and the structured retroreflective film.

26. a method according to claim 25, wherein the bonding agent precursor comprises a radiation curable bonding agent precursor.

27. A method according to claim 26, wherein the bonding agent precursor comprises a monofunctional or multifunctional acrylate monomer and a monofunctional acrylate oligomer.

28. A method according to claim 25, wherein the step of applying a fluid bonding agent precursor comprises providing a discontinuous coating of the bonding agent precursor.

29. A method according to claim 25, wherein the resultant retroreflective sheeting does not have indentations or discontinuities in the sealing film at the bonds or distorted structured elements in and near the bonds.

30. A method according to claim 25, wherein the structured retroreflective film, the thermoplastic sealing film, or both, further comprise a raised structure for spacing the sealing film away from contact with the structured elements.

31. A method according to claim 30, wherein the raised structure is textured.

32. A method according to claim 31, wherein the textured raised structure comprises a plurality of textured raised ridges.

33. A method according to claim 25, wherein the fluid bonding agent precursor is a 100% solids composition.

34. A method according to claim 25, wherein the step of solidifying the fluid bonding agent precursor comprises curing the precursor.

35. A method according to claim 34, wherein the step of solidifying the fluid bonding agent precursor comprises curing the precursor using electron-beam, ultraviolet, or visible radiation.

36. A retroreflective sheeting comprising:
   a) a structured retroreflective film having a front surface and a back surface comprising an array of structured elements protruding from the back surface, wherein incident light enters the sheet by the front surface;
   b) a thermoplastic sealing film located proximate the structured elements; and
   c) a bonding agent between the sealing film and the structured retroreflective film, wherein the bonding agent bonds the sealing film to the structured retroreflective film without embossing.

37. A method of manufacturing a retroreflective sheeting comprising the steps of:
   a) providing a thermoplastic structured retroreflective film having a front surface and a back surface comprising an array of structured elements protruding from the back surface wherein incident light enters the sheet by the front surface;
   b) providing a thermoplastic sealing film located proximate the structured elements;
   c) providing a fluid bonding agent precursor between the thermoplastic structured retroreflective film and the thermoplastic sealing film; and
   d) bonding the thermoplastic sealing film to the structured retroreflective film using the bonding agent precursor therebetween without embossing.

* * * * *

UNITED STATES PATENT AND TRADEMARK OFFICE
CERTIFICATE OF CORRECTION

PATENT NO.: 5,882,796

DATED: March 16, 1999

INVENTOR(S): Bruce E. Wilson and Cheryl M. Frey

It is certified that error appears in the above-identified patent and that said Letters Patent is hereby corrected as shown below:

Col. 1, line 51, "Appeldorn" should read --Appledorn--.

Col. 16, line 26, "(19906)" should read -- (1990) --.

Col. 17, line 32, "220" should read -- 2-20 --.

Signed and Sealed this

Twenty-seventh Day of June, 2000

Attest:

Q. TODD DICKINSON

Attesting Officer

Director of Patents and Trademarks

US005882796C1

(12) EX PARTE REEXAMINATION CERTIFICATE (4943rd)
United States Patent
Wilson et al.

(10) Number: US 5,882,796 C1
(45) Certificate Issued: Jun. 1, 2004

(54) BONDED STRUCTURED RETROREFLECTIVE SHEETING

(75) Inventors: Bruce B. Wilson, Woodbury, MN (US); Cheryl M. Frey, White Bear Lake, MN (US)

(73) Assignee: Minnesota Mining and Manufacturing Company, St. Paul, MN (US)

Reexamination Request:
No. 90/006,152, Oct. 31, 2001

Reexamination Certificate for:
Patent No.: 5,882,796
Issued: Mar. 16, 1999
Appl. No.: 08/625,156
Filed: Apr. 1, 1996

Certificate of Correction issued Jun. 27, 2000.

(51) Int. Cl.$^7$ ................................................. B32B 9/04
(52) U.S. Cl. .................... 428/411.1; 428/192; 428/195; 428/500; 428/913; 156/60; 156/306.3; 156/306.6
(58) Field of Search .............................. 428/411.1, 192, 428/195, 913, 500; 156/60, 306.3, 306.6

(56) References Cited

U.S. PATENT DOCUMENTS

| | | |
|---|---|---|
| 3,176,584 A | 4/1965 | De Vries et al. |
| 3,190,178 A | 6/1965 | McKenzie |
| 3,417,959 A | * 12/1968 | Schultz et al. .............. 249/117 |
| 3,676,539 A | 7/1972 | Fisher |
| 3,689,346 A | 9/1972 | Rowland |
| 3,712,706 A | 1/1973 | Stamm |
| 3,810,804 A | 5/1974 | Rowland |
| 3,811,983 A | 5/1974 | Rowland |
| 3,924,929 A | 12/1975 | Holmen et al. |
| 4,025,159 A | 5/1977 | McGrath |
| 4,111,876 A | 9/1978 | Bailey et al. |
| 4,123,140 A | 10/1978 | Ryan et al. |
| 4,202,600 A | 5/1980 | Burke et al. |
| 4,202,948 A | 5/1980 | Peascoe |
| 4,243,618 A | 1/1981 | Van Arnam |
| 4,327,130 A | 4/1982 | Pipkin |
| 4,332,437 A | 6/1982 | Searight et al. |
| 4,332,847 A | 6/1982 | Rowland |
| 4,345,543 A | 8/1982 | Pipkin |
| 4,349,598 A | 9/1982 | White |
| 4,387,124 A | 6/1983 | Pipkin |
| 4,391,948 A | 7/1983 | Falk et al. |
| 4,393,171 A | 7/1983 | Bracke et al. |

(List continued on next page.)

FOREIGN PATENT DOCUMENTS

| | | |
|---|---|---|
| DE | 1 504 266 | 6/1969 |
| DE | 42 11 415 A1 | 10/1993 |
| EP | 0 165 075 B1 | 12/1985 |
| EP | 0 165 075 A2 | 12/1985 |
| EP | 0 36 162 A2 | 3/1989 |

(List continued on next page.)

OTHER PUBLICATIONS

"Centrex High Performance Materials For All Seasons," Brochure of Monsanto Plastics, 49 pp. (Undated).
"Standard Test Method for Tensile Properties of Thin Plastic Sheeting," ASTM Designation: D 882–75b; *Annual Book of ASTM Standards*, Part 35, pp. 359–365 (Jan. 1976).
"Standard Text Method for Peel Resistance of Adhesives (T–Peel Test)," ASTM Designation: D 1876–93, *Annual Book of ASTM Standards*, vol. 15.06, Title page, Publication page, and pp. 105–107 (May 1993).
"Standard Test Method for Bond or Cohesive Strength of Sheet Plastics and Electrical Insulating Materials," ASTM Designation: D 952–93, pp. 205–207 (Dec. 1993).

(List continued on next page.)

*Primary Examiner*—Bruce Hess

(57) ABSTRACT

The present invention provides a retroreflective sheeting including a structured retroreflective film including an array of structured retroreflective elements, a thermoplastic sealing film located proximate the structured elements, and bonding agent between the sealing film and the structured retroreflective elements, wherein the bonding agent bonds the sealing film to the structured retroreflective film.

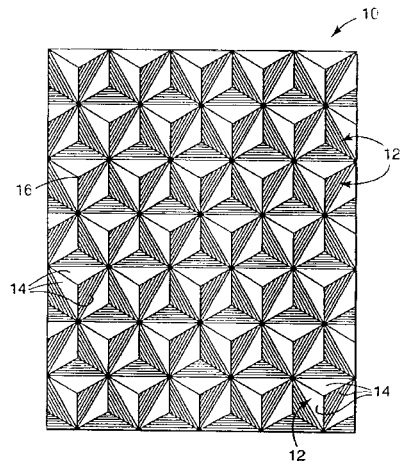

U.S. PATENT DOCUMENTS

| | | | |
|---|---|---|---|
| 4,393,172 A | 7/1983 | Lindner et al. | |
| 4,418,120 A | 11/1983 | Kealy et al. | |
| 4,436,871 A | 3/1984 | Staas | |
| 4,438,171 A | 3/1984 | Wefer | |
| 4,440,825 A | 4/1984 | Paddock | |
| 4,442,144 A | 4/1984 | Pipkin | |
| 4,444,840 A | 4/1984 | Wefer | |
| 4,444,841 A | 4/1984 | Wheeler | |
| 4,522,964 A | 6/1985 | Lindner et al. | |
| 4,528,328 A | 7/1985 | Ranade et al. | |
| 4,537,933 A | 8/1985 | Walker et al. | |
| 4,562,229 A | 12/1985 | Walker et al. | |
| 4,576,850 A | 3/1986 | Martens | |
| 4,576,860 A | 3/1986 | Fink et al. | |
| 4,587,297 A | 5/1986 | Walker et al. | |
| 4,588,258 A | 5/1986 | Hoopman | |
| 4,601,861 A | 7/1986 | Pricone et al. | |
| 4,652,274 A | 3/1987 | Boettcher et al. | |
| 4,672,089 A | 6/1987 | Pricone et al. | |
| 4,731,414 A | 3/1988 | Ting | |
| 4,751,138 A | 6/1988 | Tumey et al. | |
| 4,775,219 A | 10/1988 | Appeldorn et al. | |
| 4,801,193 A | 1/1989 | Martin | |
| 4,831,079 A | 5/1989 | Ting | |
| 4,880,554 A | 11/1989 | Newman et al. | |
| 4,880,875 A | 11/1989 | Wassmuth et al. | |
| 4,885,209 A | 12/1989 | Lindner et al. | |
| 4,885,335 A | 12/1989 | Gallucci et al. | |
| 4,894,416 A | 1/1990 | Gallucci | |
| 4,895,428 A | 1/1990 | Nelson et al. | |
| 4,903,440 A | 2/1990 | Larson et al. | |
| 4,983,436 A | 1/1991 | Bailey et al. | |
| 4,985,340 A | 1/1991 | Palazzotto et al. | |
| 5,055,113 A | 10/1991 | Larson et al. | |
| 5,064,272 A | 11/1991 | Bailey et al. | |
| 5,066,098 A | 11/1991 | Kult et al. | |
| 5,068,285 A | 11/1991 | Laughner | |
| 5,069,964 A | 12/1991 | Tolliver et al. | |
| 5,070,142 A | 12/1991 | Giles, Jr. et al. | |
| 5,070,665 A | 12/1991 | Marrin et al. | |
| 5,082,897 A | 1/1992 | Udipi | |
| 5,104,934 A | 4/1992 | Udipi | |
| 5,106,919 A | 4/1992 | Canova et al. | |
| 5,117,304 A | 5/1992 | Huang et al. | |
| 5,120,788 A | 6/1992 | Seitz et al. | |
| 5,162,423 A | 11/1992 | Neumann et al. | |
| 5,167,894 A | 12/1992 | Baumgarten | |
| 5,196,480 A | 3/1993 | Seitz et al. | |
| 5,236,472 A | 8/1993 | Kirk et al. | |
| 5,272,562 A | 12/1993 | Coderre | |
| 5,306,548 A | 4/1994 | Zabrocki et al. | |
| 5,310,436 A | 5/1994 | Pricone et al. | |
| 5,450,235 A | 9/1995 | Smith et al. | |
| 5,491,586 A | 2/1996 | Phillips | |
| 5,614,286 A | 3/1997 | Bacon, Jr. et al. | |
| 5,754,338 A | 5/1998 | Wilson et al. | |
| 5,779,962 A | 7/1998 | Andraschko et al. | |
| 5,784,197 A | 7/1998 | Frey et al. | |
| 5,822,121 A * | 10/1998 | Smith et al. | 359/530 |
| 5,910,858 A | 6/1999 | Frey et al. | |
| 5,914,812 A * | 6/1999 | Benson et al. | 359/529 |
| 6,214,460 B1 * | 4/2001 | Bluem et al. | 428/355 |

FOREIGN PATENT DOCUMENTS

| | | |
|---|---|---|
| EP | 0 306 161 A2 | 3/1989 |
| EP | 0 370 347 B1 | 5/1990 |
| EP | 0 448 953 | 10/1991 |
| EP | 0 508 173 A1 | 10/1992 |
| EP | 0 672 921 A2 | 9/1995 |
| EP | 0 891 568 B1 | 1/1999 |
| GB | 1052550 | 12/1966 |
| GB | 2 254 826 | 10/1992 |
| GB | 2 255 044 | 10/1992 |
| GB | 2 267 865 | 12/1993 |
| WO | WO 95/07179 | 3/1995 |
| WO | WO 95/11464 | 4/1995 |
| WO | WO 95/11468 | 4/1995 |
| WO | WO 95/11469 | 4/1995 |
| WO | WO 97/37250 | 10/1997 |
| WO | WO 97/37251 | 10/1997 |
| WO | WO 97/37253 | 10/1997 |
| WO | WO 97/37429 | 10/1997 |

OTHER PUBLICATIONS

"Standard Specifications and Operating Instructions for Glass Capillary Kinematic Viscometers," ASTM Designation: D 446–93, *Annual Book of ASTM Standards*, vol. 05.01, Title page, Publication page and pp. 162–183 (Jan. 1994).

"Standard Test Method for Coefficient of Retroreflection of Retroreflective Sheeting," ASTM Designation: E 810–94, pp. 818–824 (Apr. 1994).

Allen et al. "UV and Electron Beam Curable Pre–Polymers and Diluent Monomers: Classification, Preparation and Properties," in *Radiation Curing in Polymer Science and Technology*; vol. 1; Fundamentals and Methods: Fouassier et al., Eds., Elvesier Applied Science; London; Title page, Publication page, Table of Contents and Chapter 5, pp. 225–262 (1993).

Eckberg, "UV Cure of Epoxysiloxanes," *Radiation Curing in Polymer Science & Technology*, vol. IV., Fouasser et al., Eds., Elsevier, New York, Chap. 2, pp. 19–49 (1993).

*Federation Series on Coatings Technology: Radiation Cured Coatings*, Federation of Societies for Coatings Technology, Philadelphia, pp. 7–13 and 24 (Jun. 1986).

Hensley et al., *Federation Series On Coating Technology: Amino Resins in Coatings*, Federation of Societies for Coatings Technology, Philadelphia, pp. 5–31 (Dec. 1969).

*Radiation Curing Primer I: Inks, Coatings and Adhesives*; Kallendorf et al.; RadTech International North America; Northbrook, Ill: Title page, Publication page, Table of Contents, and Chap. 4, pp. 45–54 (Mar. 1990).

*Paint and Surface Coatings, Theory and Practice*; Lamborune, Ed., Ellis Horwood Ltd.; New York; Title page, Publication page, and pp. 58–110 (1987).

Peeters, "Overview of Dual–Cure and Hybrid–Cure Systems in Radiation Curing," *Radiation Curing in Polymer Science and Technology*, vol. III, Fouasser et al., Eds., Elsevier, New York, Chap. 6, pp. 177–217 (1993).

Prioia et al., "Factors Influencing the Adhesion Properties of Radiation Curable Coatings on Different Substrates," XIIIth International Conference in Organic Coatings Science and Technology, pp. 303–318 (1987).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 20-24 is confirmed.

Claims 1, 10-13, 15, 18, 25, 27, 36 and 37 are determined to be patentable as amended.

Claims 2-9, 14, 16, 17, 19, 26 and 28-35, dependent on an amended claim, are determined to be patentable.

1. A retroreflective sheeting comprising:
   a) a structured retroreflective film having a front surface and a back surface comprising an array of structured elements protruding from the back surface, wherein incident light enters the sheet by the front surface;
   b) a thermoplastic sealing film located proximate the structured elements; and
   c) a bonding agent layer between the sealing film and the structured retroreflective film, wherein the bonding agent forms bonds between the sealing film and the structured retroreflective film without indentations of discontinuities in the sealing film at the bonds and without distorted structured elements in and near the bonds, *and further wherein the bonding agent is prepared from a bonding agent precursor comprising a reactive diluent and a film former*.

10. A retroreflective sheeting according to claim 1, wherein *at least one of* the [bonding agent is prepared from a] bonding agent precursor [comprising] *components is* a thermally curable component.

11. A retroreflective sheeting according to claim 1, wherein *at least one of* the [bonding agent is prepared from a] bonding agent precursor [comprising] *components is* a radiation curable component.

12. A retroreflective sheeting according to claim 11, wherein the radiation curable component [comprises a cationic curable resin, a free radical curable resin, or mixtures thereof] *is curable using a cationic mechanism, a free radical mechanism, or both*.

13. A retroreflective sheeting according to claim [11] *1*, wherein the [radiation curable component comprises a dual-cure resin or a hydrid-cure resin] *film former comprises an acrylated aliphatic urethane and the reactive diluent comprises an acrylate monomer*.

15. A retroreflective sheeting according to claim 14, wherein the acrylate *is the film former and* is selected from the group consisting of an acrylated epoxy, an acrylated polyester, an acrylated aromatic or aliphatic urethane, an acrylated acrylic, an acrylated silicone, an acrylated polyether, a vinyl acrylate, and an acrylated oil.

18. A retroreflective sheeting according to claim 17, wherein the [bonding agent precursor further] *reactive diluent* comprises a monofunctional or multifunctional reactive monomer.

25. A method of manufacturing a retroreflective sheeting comprising the steps of:
   a) providing a thermoplastic structured retroreflective film having a front surface and a back surface comprising an array of structured elements protruding from the back surface, wherein incident light enters the sheet by the front surface;
   b) providing a thermoplastic sealing film;
   c) applying a fluid bonding agent precursor to the thermoplastic structured retroreflective film, the thermoplastic sealing film, or both, *wherein the bonding agent precursor comprises a reactive diluent and a film former*;
   d) contacting the thermoplastic sealing film with the structured retroreflective film while the bonding agent precursor is a fluid that the thermoplastic sealing film is proximate the structured elements with the bonding agent precursor therebetween; and
   e) solidifying the fluid bonding agent precursor to form bonds between the sealing film and the structured retroreflective film.

27. A method according to claim 26, wherein the [bonding agent precursor] *reactive diluent* comprises a monofunctional or multifunctional acrylate monomer *and the film former comprises* a monofunctional acrylate oligomer.

36. A retroreflective sheeting comprising:
   a) a structured retroreflective film having a front surface and a back surface comprising an array of structured elements protruding from the back surface, wherein incident light enters the sheet by the front surface;
   b) a thermoplastic sealing film located proximate the structured elements; and
   c) a boding agent between the sealing film and the structured retroreflective film, wherein the bonding agent bonds the sealing film to the structured retroreflective film without embossing, *and further wherein the bonding agent is prepared from a bonding agent precursor comprising a reactive diluent and a film former*.

37. A method of manufacturing a retroreflective sheeting comprising the steps of:
   a) providing a thermoplastic structured retroreflective film having a front surface and a back surface comprising an array of structured elements protruding from the back surface wherein incident light enters the sheet by the front surface;
   b) providing a thermoplastic sealing film located proximate the structured elements;
   c) providing a fluid bonding agent precursor between the thermoplastic structured retroreflective film and the thermoplastic sealing film, *wherein the bonding agent precursor comprises a reactive diluent and a film former*; and
   d) bonding the thermoplastic sealing film to the structured retroreflective film using the bonding agent precursor therebetween without embossing.

* * * * *